US012700951B2

(12) United States Patent (10) Patent No.: US 12,700,951 B2
Park et al. (45) Date of Patent: Aug. 4, 2026

(54) METHOD AND APPARATUS FOR TRANSMITTING AND RECEIVING WIRELESS SIGNAL IN WIRELESS COMMUNICATION SYSTEM

(71) Applicant: LG ELECTRONICS INC., Seoul (KR)

(72) Inventors: Haewook Park, Seoul (KR); Kijun Kim, Seoul (KR); Joonkui Ahn, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 639 days.

(21) Appl. No.: 18/019,352

(22) PCT Filed: Aug. 4, 2021

(86) PCT No.: PCT/KR2021/010192
§ 371 (c)(1),
(2) Date: Feb. 2, 2023

(87) PCT Pub. No.: WO2022/030978
PCT Pub. Date: Feb. 10, 2022

(65) Prior Publication Data
US 2023/0269032 A1 Aug. 24, 2023

(30) Foreign Application Priority Data
Aug. 4, 2020 (KR) ........................ 10-2020-0097657

(51) Int. Cl.
*H04L 1/1812* (2023.01)

(52) U.S. Cl.
CPC ................................. *H04L 1/1812* (2013.01)

(58) Field of Classification Search
CPC ... H04L 1/1812; H04L 1/0026; H04L 1/1822; H04L 1/203; H04L 1/1896; H04L 1/00; H04L 1/1614; H04L 1/1864; H04B 7/06; H04B 7/185; H04W 72/12; H04W 84/06
See application file for complete search history.

(56) References Cited

U.S. PATENT DOCUMENTS

2016/0261391 A1* 9/2016 Chen ...................... H04L 1/1861
2020/0382207 A1* 12/2020 Medles ................. H04L 1/1822
2021/0067220 A1* 3/2021 Abdelghaffar .... H04W 52/0229
2021/0227570 A1* 7/2021 Park ........................ H04L 1/189
(Continued)

OTHER PUBLICATIONS

Moderator (ZTE), "Summary#3 of AI 8.4.3 for HARQ in NTN", 3GPP TSG RAN WG1 #102-E, R1-2007311 (Year: 2020).*
(Continued)

*Primary Examiner* — Ayaz R Sheikh
*Assistant Examiner* — Mang Boi Thawng
(74) *Attorney, Agent, or Firm* — BRYAN CAVE LEIGHTON PAISNER LLP

(57) ABSTRACT

The present invention relates to a method and an apparatus therefor, the method comprising the steps of: receiving control information for deactivating hybrid automatic repeat and request (HARQ) feedback; receiving a downlink signal on the basis of the HARQ feedback being deactivated; and transmitting, as channel state information (CSI), information on whether or not the downlink signal has been successfully decoded on the basis of a preset time point.

10 Claims, 20 Drawing Sheets

(56) References Cited

U.S. PATENT DOCUMENTS

| | | | | |
|---|---|---|---|---|
| 2022/0045803 | A1* | 2/2022 | Lin | H04L 1/1822 |
| 2022/0225290 | A1* | 7/2022 | Ganesan | H04W 24/10 |
| 2022/0239417 | A1* | 7/2022 | Cheng | H04L 1/1835 |
| 2022/0376844 | A1* | 11/2022 | Muruganathan | H04W 72/23 |
| 2023/0163887 | A1* | 5/2023 | Cheng | H04W 72/23 |
| | | | | 370/329 |
| 2023/0239869 | A1* | 7/2023 | Wu | H04L 1/0026 |
| | | | | 370/329 |

OTHER PUBLICATIONS

Sony, "Discussion on delay-tolerant HARQ for NTN", 3GPP TSG RAN WG1 Meeting #99 , R1-1912349 (Year: 2019).*

* cited by examiner (a)

(b)

(a)

(b)

· Common TA (Tcom) = 2*D0/c
· UE specific differential TA for xth UE (TUEx) = 2*(D1x-D0)/c
· Full TA (Tfull) = Tcom+TUEx (a) Regenerative payload · Common TA (Tcom) = 2*(D01+D02)/c
· UE specific differential TA for xth UE (TUEx) = 2*(D1x-D01)/c
· Full TA (Tfull) = Tcom+TUEx (b) Transparent payload

Device(100, 200)

METHOD AND APPARATUS FOR TRANSMITTING AND RECEIVING WIRELESS SIGNAL IN WIRELESS COMMUNICATION SYSTEM

CROSS-REFERENCE TO RELATED APPLICATIONS

This application is a National Phase application under 35 U.S.C. 371 of International Application No. PCT/KR2021/010192, filed on Aug. 4, 2021, which claims the benefit of Korean Application No. 10-2020-0097657, filed on Aug. 4, 2020. The disclosures of the prior applications are incorporated by reference in their entirety

TECHNICAL FIELD

The present disclosure relates to a wireless communication system, and more particularly, to a method and apparatus for transmitting and receiving a wireless signal.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (MDMA) system, a time division multiple access (TDMA) system, an orthogonal frequency division multiple access (OFDMA) system, and a single carrier frequency division multiple access (SC-FDMA) system.

SUMMARY

An aspect of the present disclosure is to provide a method and apparatus for efficiently transmitting and receiving a wireless signal.

In addition, one object of the present disclosure is to provide a method and device for reporting Channel State Information (CSI) more efficiently to solve the latency problem caused by relatively long round-trip delay (RTT) in a Non-Terrestrial Network (NTN) environment.

It will be appreciated by persons skilled in the art that the objects that could be achieved with the present disclosure are not limited to what has been particularly described hereinabove and the above and other objects that the present disclosure could achieve will be more clearly understood from the following detailed description.

In a first technical aspect of the present disclosure, provided is a method of operating a user equipment in a wireless communication system including a Non-Terrestrial Network (NTN), the method including receiving control information for disabling Hybrid Automatic Repeat and reQuest (HARQ) feedback, receiving a downlink signal based on the disabled HARQ feedback, and transmitting information on whether decoding of the downlink signal is successful as Channel State Information (CSI) based on a preconfigured timing point.

In a second technical aspect of the present disclosure, provided is a user equipment operating in a wireless communication system including a Non-Terrestrial Network (NTN), the user equipment including at least one Radio Frequency (RF) unit, at least one processor, and at least one computer memory operably connected to the at least one processor and enabling the at least one processor to perform an operation when executed, the operation including receiving control information for disabling Hybrid Automatic Repeat and reQuest (HARQ) feedback, receiving a downlink signal based on the disabled HARQ feedback, and transmitting information on whether decoding of the downlink signal is successful as Channel State Information (CSI) based on a preconfigured timing point.

In a third technical aspect of the present disclosure, provided is an apparatus for a user equipment, the apparatus including at least one processor and at least one computer memory operably connected to the at least one processor and enabling the at least one processor to perform an operation when executed, the operation including receiving control information for disabling Hybrid Automatic Repeat and reQuest (HARQ) feedback, receiving a downlink signal based on the disabled HARQ feedback, and transmitting information on whether decoding of the downlink signal is successful as Channel State Information (CSI) based on a preconfigured timing point.

In a fourth technical aspect of the present disclosure, provided is a computer-readable storage medium including at least one program enabling at least one processor to perform an operation when executed, the operation including receiving control information for disabling Hybrid Automatic Repeat and reQuest (HARQ) feedback, receiving a downlink signal based on the disabled HARQ feedback, and transmitting information on whether decoding of the downlink signal is successful as Channel State Information (CSI) based on a preconfigured timing point.

In a fifth technical aspect of the present disclosure, provided is a method of operating a base station in a wireless communication system including a Non-Terrestrial Network (NTN), the method including transmitting control information for disabling Hybrid Automatic Repeat and reQuest (HARQ) feedback to a user equipment, transmitting a downlink signal to the user equipment based on the disabled HARQ feedback, and receiving information on whether decoding of the downlink signal is successful as Channel State Information (CSI) based on a preconfigured timing point from the user equipment.

In a sixth technical aspect of the present disclosure, provided is a base station operating in a wireless communication system including a Non-Terrestrial Network (NTN), the base station including at least one Radio Frequency (RF) unit, at least one processor, and at least one computer memory operably connected to the at least one processor and enabling the at least one processor to perform an operation when executed, the operation including transmitting control information for disabling Hybrid Automatic Repeat and reQuest (HARQ) feedback to a user equipment, transmitting a downlink signal to the user equipment based on the disabled HARQ feedback, and receiving information on whether decoding of the downlink signal is successful as Channel State Information (CSI) based on a preconfigured timing point from the user equipment.

According to one embodiment, the information on whether the decoding of the downlink signal is successful may include information on whether the decoding of the downlink signal is successful for latest N time units from the preconfigured timing point and the N may be a natural number equal to or greater than 1.

According to one embodiment, the information on whether the decoding of the downlink signal is successful may be represented as bitmap information.

According to one embodiment, each bit of the bitmap information may indicate whether the decoding of the downlink signal is successful in each of the N time units.

According to one embodiment, whether the decoding of the downlink signal is successful in the each of the N time units may be represented as 2 bits of the bitmap information and the 2 bits may indicate whether decoding of Physical Downlink Share Channel (PDSCH) received in the each of the N time units and Physical Downlink Control Channel (PDCCH) for scheduling the PDSCH is successful.

According to one embodiment, the preconfigured timing point may include a timing point before M time units from a reporting timing point of the CSI, a timing point of triggering the reporting of the CSI, or a timing point of receiving control information for triggering the reporting of the CSI and the M may be a natural number equal to or greater than 1.

According to one embodiment, a value of the M may be determined based on a timing offset value configured for the NTN.

According to one embodiment, the time unit may include a slot, a sub-slot, or a symbol.

According to one embodiment, the information on whether the decoding of the downlink signal is successful may include a probability on whether the decoding of the downlink signal is successful.

According to one embodiment, the probability may include a success probability of the decoding of the downlink signal accumulated from an initial access to the preconfigured timing point or a success probability of the decoding of the downlink signal during a time period determined based on the preconfigured timing point.

According to one embodiment, the CSI may further include information indicating whether a channel is a Line Of Sight (LOS) environment or a Non-LOS (NLOS) environment.

According to the present disclosure, a wireless signal may be transmitted and received efficiently in a wireless communication system.

According to the present disclosure, it is possible to solve a latency problem caused by a relatively large round trip delay (RTD) in a non-terrestrial network (NTN) environment.

According to the present disclosure, in an NTN environment, Channel State Information (CSI) may be reported more efficiently.

According to the present disclosure, even when HARQ feedback is disabled, a base station may more appropriately configure parameters for channel configuration based on CSI reported by a UE.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF DRAWINGS

FIG. 17 illustrates a communication system applied to the present disclosure.

DETAILED DESCRIPTION

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive machine type communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
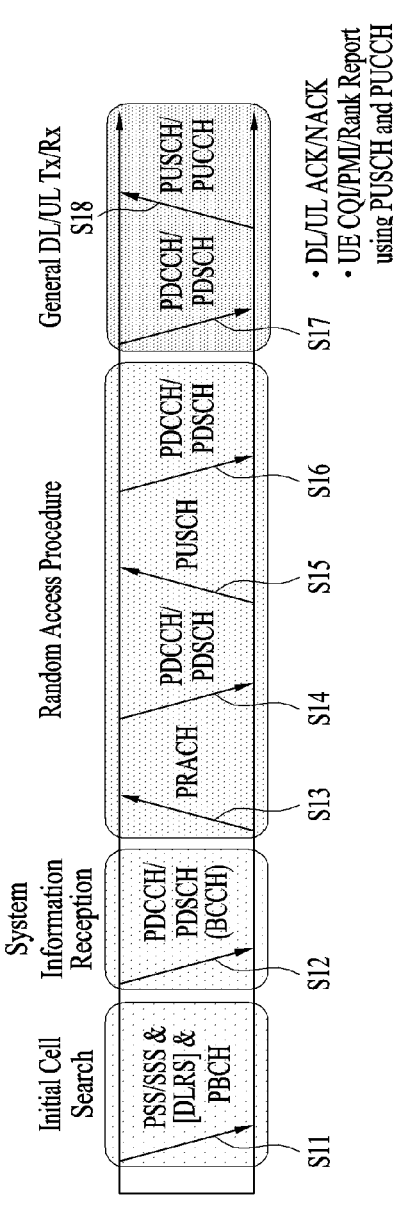
FIG. 1 illustrates physical channels used in a 3rd generation partnership project (3GPP) system as an exemplary wireless communication systems and a general signal transmission method using the same.

FIG. 1 illustrates physical channels used in a 3GPP NR system and a general signal transmission method using the same.

When powered on or when a UE initially enters a cell, the UE performs initial cell search involving synchronization with a BS in step S101. For initial cell search, the UE receives synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
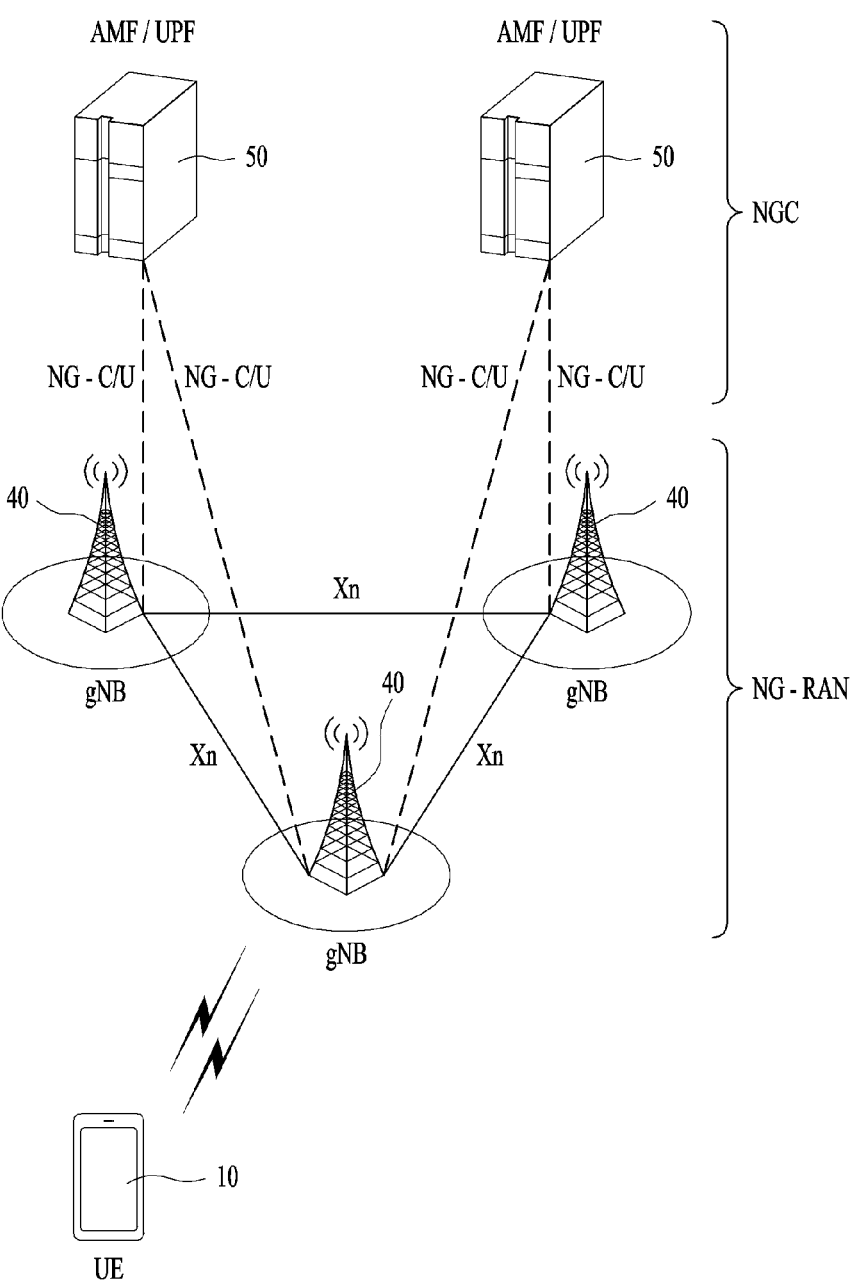
FIG. 2 illustrates the structure of an NR system to which embodiment(s) are applicable.

FIG. 2 illustrates the structure of a NR system to which the present disclosure is applicable.

Referring to FIG. 2, a next generation radio access network (NG-RAN) may include a next generation Node B (gNB) and/or an eNB, which provides user-plane and control-plane protocol termination to a UE. In FIG. 2, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 3:
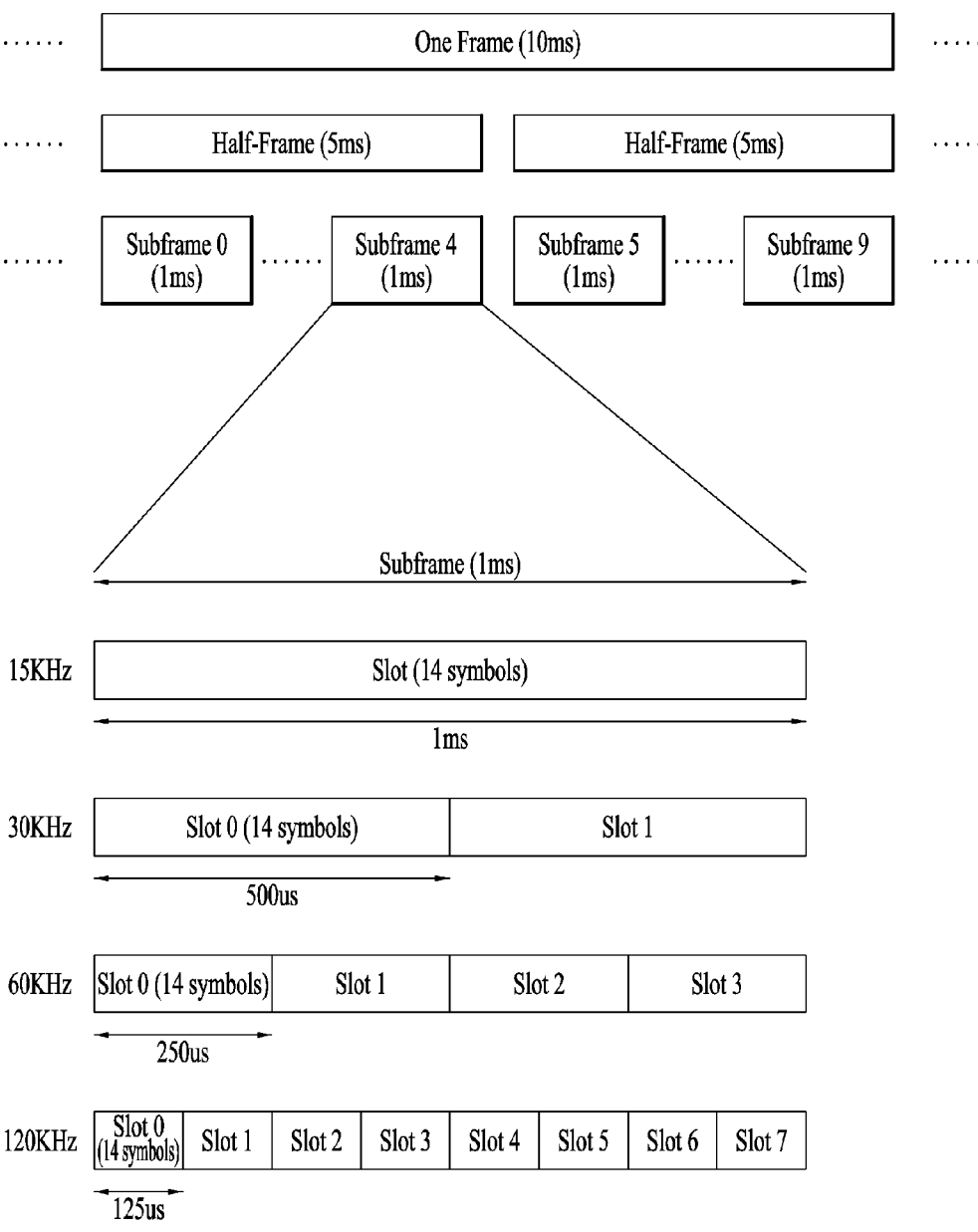
FIG. 3 illustrates the structure of an NR radio frame to which embodiment(s) are applicable.

FIG. 3 illustrates a structure of a radio frame used in NR.

In NR, UL and DL transmissions are configured in frames. The radio frame has a length of 10 ms and is defined as two 5 ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

[Table 1] illustrates that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: number of symbols in a slot
* $N^{frame, u}_{slot}$: number of slots in a frame
* $N^{subframe, u}_{slot}$: number of slots in a subframe

[Table 2] illustrates that the number of symbols per slot, the number of slots per frame, and the number of slots per subframe vary according to the SCS when the extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

The frame structure is merely an example. The number of subframes, the number of slots, and the number of symbols in a frame may vary.

In the NR system, different OFDM numerologies (e.g., SCSs) may be configured for a plurality of cells aggregated for one UE. Accordingly, the (absolute time) duration of a time resource including the same number of symbols (e.g., a subframe (SF), slot, or TTI) (collectively referred to as a time unit (TU) for convenience) may be configured to be different for the aggregated cells. A symbol may be an OFDM symbol (or CP-OFDM symbol) or an SC_FDMA symbol (or a discrete Fourier transform-spread-OFDM (DFT-s-OFDM) symbol).

In NR, various numerologies (or SCSs) are supported to support various 5G services. For example, with an SCS of 15 kHz, a wide area in traditional cellular bands is supported, while with an SCS of 30/60 kHz, a dense urban area, a lower latency, and a wide carrier bandwidth are supported. With an SCS of 60 kHz or higher, a bandwidth larger than 24.25 GHz is be supported to overcome phase noise.

An NR frequency band may be defined by two types of frequency ranges, FR1 and FR2. FR1 and FR2 may be configured as described in Table 3. FR2 may refer to millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 4:
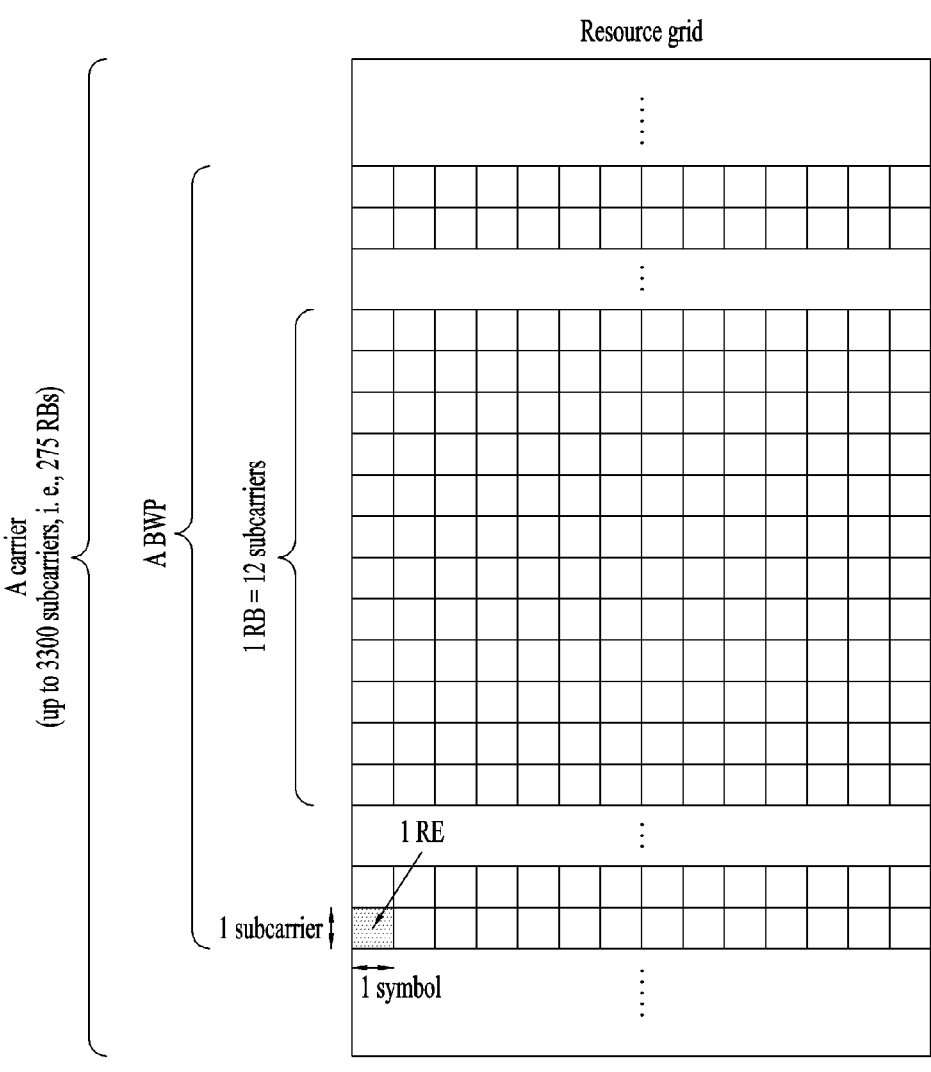
FIG. 4 illustrates the slot structure of an NR frame to which embodiment(s) are applicable.

FIG. 4 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

CSI (Channel State Information)

Channel State Information (CSI) is a collective term for information that may indicate the quality of a radio channel (or link) formed between a UE and an antenna port.

In a New Radio (NR) system, Channel State Information-Reference Signal (CSI-RS) is used for time and/or frequency tracking, CSI computation, Layer 1-Reference Signal Received Power (L1-RSRP) computation, and mobility. Here, the CSI computation is related to CSI acquisition, and the L1-RSRP computation is related to Beam Management (BM).

Figure 5:
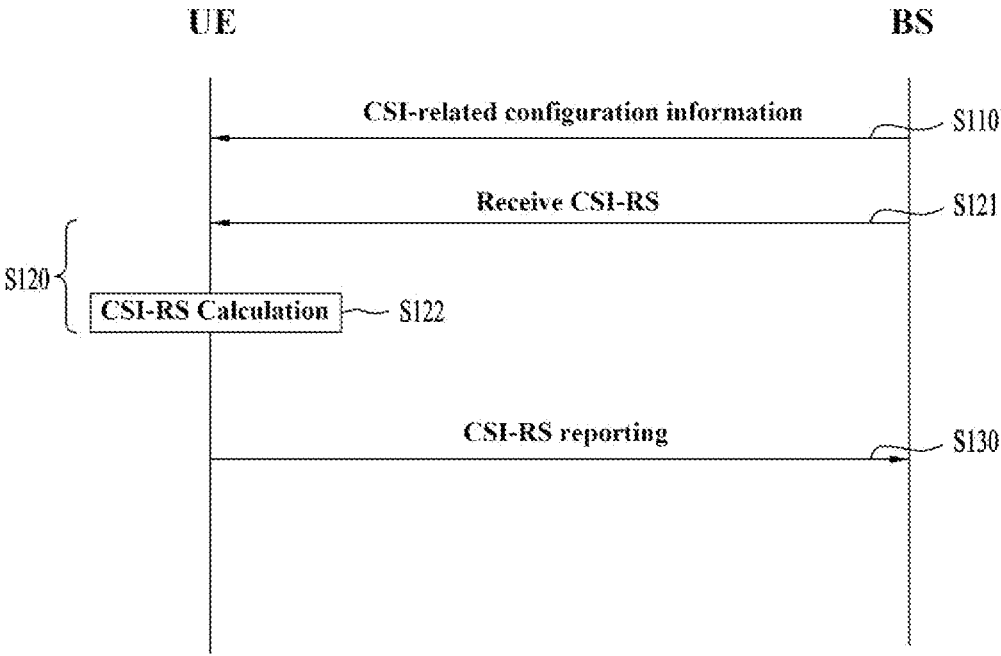
FIG. 5 is a flowchart illustrating one example of a CSI related procedure.

FIG. 5 is a flowchart illustrating one example of a CSI related procedure.

In order to perform one of the uses of the CSI-RS described above, a User Equipment (UE) may receive CSI configuration information from a Base Station (BS) (e.g. gNB) through Radio Resource Control (RRC) signaling (S110).

The CSI configuration information may include at least one of CSI-Information Management (CSI-IM) resource related information, CSI measurement configuration information, CSI resource configuration-information, CSI-RS resource information, or CSI report configuration information.

i) The CSI-IM resource related information may include CSI-IM resource information, CSI-IM resource set information, and the like. A CSI-IM resource set is identified by a CSI-IM resource set Identifier (ID), and one resource set includes at least one CSI-IM resource. Each CSI-IM resource is identified by a CSI-IM resource ID.

ii) The CSI resource configuration information may be expressed as CSI-ResourceConfig IE. The CSI resource configuration information defines a group that includes at least one of a Non-Zero Power (NZP) CSI-RS resource set, a CSI-IM resource set, or a CSI-SSB resource set. That is, the CSI resource configuration information may include a CSI-RS resource set list, and the CSI-RS resource set list may include at least one of an NZP CSI-RS resource set list, a CSI-IM resource set list, or a CSI-SSB resource set list. The CSI-RS resource set is identified by a CSI-RS resource set ID, and one resource set includes at least one CSI-RS resource. Each CSI-RS resource is identified by a CSI-RS resource ID.

As shown in Table 4, parameters (e.g., BM-related 'repetition' parameter and tracking-related 'trs-Info' parameter) indicating the use of CSI-RS may be configured for each NZP CSI-RS resource set. Table 4 shows one example of an NZP CSI-RS resource set IE.

TABLE 4

```
-- ASN1START
-- TAG-NZP-CSI-RS-RESOURCESET-START
NZP-CSI-RS-ResourceSet ::=   SEQUENCE {
   nzp-CSI-ResourceSetId      NZP-CSI-RS-ResourceSetId,
   nzp-CSI-RS-Resources       SEQUENCE (SIZE
(1..maxNrofNZP-CSI-RS-ResourcesPerSet)) OF NZP-CSI-RS-ResourceId,
   repetition                 ENUMERATED { on,
off }
                  OPTIONAL,
   aperiodicTriggeringOffset  INTEGER(0..4)
                  OPTIONAL, -- Need S
   trs-Info                   ENUMERATED {true}
                  OPTIONAL, -- Need R
   ...
}
-- TAG-NZP-CSI-RS-RESOURCESET-STOP
-- ASN1STOP
```

In addition, the ' repetition' parameter corresponding to a higher layer parameter corresponds to the L1 parameter 'CSI-RS-ResourceRep' iii) CSI reporting configuration information includes a 'reportConfigType' parameter indicating time domain behavior and a 'report Quantity' parameter indicating CSI quantity for reporting. The time domain behavior may be periodic, aperiodic, or semi-persistent.

CSI report configuration information may be represented as CSI-ReportConfig IE, and Table 5 below shows an example of CSI-ReportConfig IE.

TABLE 5

```
-- ASN1START
-- TAG-CSI-RESOURCECONFIG-START
CSI-ReportConfig ::=                     SEQUENCE {
   reportConfigId                        CSI-
ReportConfigId,
   carrier
   ServCellIndex                         OPTIONAL, -- Need S
   resourcesForChannelMeasurement        CSI-ResourceConfigId,
   csi-IM-ResourcesForInterference       CSI-ResourceConfigId
      OPTIONAL, -- Need R
   nzp-CSI-RS-ResourcesForInterference   CSI-ResourceConfigId
   OPTIONAL,  -- Need R
   reportConfigType                      CHOICE {
```

TABLE 5-continued

```
         periodic
SEQUENCE {
      reportSlotConfig                        CSI-
ReportPeriodicityAndOffset,
      pucch-CSI-ResourceList
   SEQUENCE (SIZE (1..maxNrofBWPs)) OF PUCCH-CSI-Resource
   },
      semiPersistentOnPUCCH                   SEQUENCE {
      reportSlotConfig                        CSI-
ReportPeriodicityAndOffset,
      pucch-CSI-ResourceList
   SEQUENCE (SIZE (1..maxNrofBWPs)) OF PUCCH-CSI-Resource
   },
      semiPersistentOnPUSCH                   SEQUENCE {
      reportSlotConfig
   ENUMERATED {sl5, sl10, sl20, sl40, sl80, sl160, sl320},
      reportSlotOffsetList                    SEQUENCE (SIZE (1..
maxNrofUL-Allocations)) OF INTEGER(0..32),
      p0alpha
   P0-PUSCH-AlphaSetId
   },
      aperiodic
SEQUENCE {
      reportSlotOffsetList                    SEQUENCE (SIZE
(1..maxNrofUL-Allocations)) OF INTEGER(0..32)
   }
},
   reportQuantity                             CHOICE {
   none                                       NULL,
   cri-RI-PMI-CQI                             NULL,
   cri-RI-i1                                  NULL,
   cri-RI-i1-CQI                              SEQUENCE {
   pdsch-BundleSizeForCSI
   ENUMERATED {n2, n4}                        OPTIONAL
   },
   cri-RI-CQI                                 NULL,
   cri-RSRP                                   NULL,
   ssb-Index-RSRP                             NULL,
   cri-RI-LI-PMI-CQI                          NULL
},
```

The UE may measure a CSI based on CSI configuration information (S120).

The CSI measurement may include: (1) a CSI-RS reception step S121 of the UE; and (2) a step S122 of computing a CSI based on the received CSI-RS, which will be described in detail later.

For the CSI-RS, Resource Element (RE) mapping of a CSI-RS resource is configured in the time and frequency domain based on a higher layer parameter CSI-RS-ResourceMapping. Table 6 shows one example of CSI-RS-Resource Mapping IE.

TABLE 6

```
-- ASN1START
-- TAG-CSI-RS-RESOURCEMAPPING-START
CSI-RS-ResourceMapping ::=           SEQUENCE {
   frequencyDomainAllocation         CHOICE {
      row1                           BIT STRING
(SIZE (4)),
      row2                           BIT STRING
(SIZE (12)),
      row4                           BIT STRING
(SIZE (3)),
      other                          BIT STRING
(SIZE (6))
   }
   nrofPorts                         ENUMERATED
{p1,p2,p4,p8,p12,p16,p24,p32},
   firstOFDMSymbolInTimeDomain        INTEGER (0..13),
   firstOFDMSymbolInTimeDomain2       INTEGER (2..12)
      OPTIONAL, -- Need R
   cdm-Type
   ENUMERATED {noCDM, fd-CDM2, cdm4-FD2-TD2,
cdm8-FD2-TD4},
```

TABLE 6-continued

```
   density                           CHOICE {
   dot5
   ENUMERATED {evenPRBs, oddPRBs},
      one                            NULL,
      three                          NULL,
      spare                          NULL
   },
   freqBand                          CSI-
FrequencyOccupation,
   ...
}
```

In Table 6, Density (D) represents a CSI-RS resource density measured by RE/port/PRB (physical resource block), and 'nrofPorts' represents the number of antenna ports.

The UE may report the measured CSI to the base station (S130).

Here, if a quality parameter of the CSI-ReportConfig IE in Table 5 is set to 'none (or No report), the UE may omit the CSI report. However, according to an embodiment, even when the quantity parameter is set to 'none (or No report), the UE may report the CSI to the base station.

If a quantity parameter is set to 'none', it may mean a case that an aperiodic TRS is triggered or a case that a repetition parameter is configured. In this case, only when the repetition parameter is set to 'ON', the UE may omit the CSI report.

CSI Measurement

The NR system supports more flexible and dynamic CSI measurement and reporting. Here, the CSI measurement may include a procedure for receiving a CSI-RS and obtaining a CSI based on the received CSI-RS.

As time domain behavior of CSI measurement and reporting, aperiodic/anti-persistent/periodic Channel Measurement (CM) and Interference Measurement (IM) are supported. A 4-port NZP CSI-RS RE pattern may be used for configuration of CSI-IM.

NR's CSI-IM-based Interference Measurement Resource (IMR) has a design similar to that of LTE's CSI-IM and is configured independently from ZP CSI-RS resources for PDSCH rate matching. In NZP CSI-RS-based IMR, each port emulates an interference layer having a (desirable channel and) precoded NZP CSI-RS. This is for intra-cell interference measurement in a multi-user case and mainly targets Multi-User (MU) interference.

The base station transmits the precoded NZP CSI-RS on each port of the configured NZP CSI-RS-based IMR to the UE.

The UE assumes a channel/interference layer for each port in the resource set and then measures interference. In the absence of any PMI and RI feedback for a channel, a plurality of resources are configured in the resource set, and the base station or network indicates a subset of NZP CSI-RS resources for channel/interference measurement through DCI.

CSI Reporting

For CSI reporting, time and frequency resources available for the UE are controlled by the base station. CSI may include at least one of Channel Quality Indicator (CQI), Precoding Matrix Indicator (PMI), CSI-RS Resource Indicator (CRI), SS/PBCH Block Resource Indicator (SSBRI), Layer Indicator (LI), Rank Indicator (RI), or L1-RSRP. With respect to CQI, PMI, CRI, SSBRI, LI, RI, and L1-RSRP, 'N≥1 CSI-Report Config reporting settings', 'M≥1 CSI-ResourceConfig resource setting', and the list of one or two trigger states (i.e., the list provided by aperiodicTriggerStateList and semiPersistentOnPUSCH-TriggerStateList) may be configured for the UE by higher layer signaling. In the aperiodicTriggerStateList, each trigger state includes an associated CSI-ReportConfig list indicating a channel and resource set IDs for optional interference. In the semiPersistentOnPUSCH-TriggerStateList, each trigger state includes one associated CSI-ReportConfig.

In addition, time domain behavior of CSI reporting supports periodic, semi-persistent, and aperiodic reportings.

i) The periodic CSI reporting may be performed on short PUCCH or long PUCCH. Periodicity and slot offset of the periodic CSI reporting may be configured through RRC signaling, and specifically, through CSI-ReportConfig IE.

ii) The Semi-Persistent CSI (SP CSI) reporting may be performed on short PUCCH, long PUCCH, or PUSCH. In the case of the SP CSI reporting performed on the short/long PUCCH, periodicity and slot offset may be configured through RRC signaling, and the CSI reporting may be activated/deactivated through a separate Medium Access Control (MAC) Control Element (CE). In case of the SP CSI reporting performed on PUSCH, periodicity of the semi-persistent CSI reporting is configured through RRC signaling, but slot offset is not configured through the RRC signaling. In addition, the SP CSI reporting may be activated/deactivated by DCI format 0_1. In the case of the SP CSI reporting performed on the PUSCH, a separated RNTI (e.g., SP-CSI C-RNTI) may be used.

An initial CSI reporting timing follows a PUSCH time domain allocation value indicated by the DCI, and a subsequent CSI reporting timing may be determined according to periodicity configured through RRC signaling.

DCI format 0_1 includes a 'CSI request' field and may activate/deactivate a specific configured SP-CSI trigger state. The SP CSI reporting has the same or similar activation/deactivation as the mechanism with data transmission on SPS PUSCH.

iii) The Aperiodic CSI (AP CSI) reporting is performed on PUSCH and triggered by DCI. In this case, information on the trigger of the aperiodic CSI reporting may be delivered/indicated/configured through MAC-CE.

Timing of aperiodic CSI with an aperiodic CSI-RS is configured through RRC signaling, and a timing related to aperiodic CSI reporting is dynamically controlled by DCI.

In NR, a reporting method of dividing CSI in a plurality of reporting instances applied to the PUCCH-based CSI reporting in LTE (e.g., transmission in the order of RI, WB PMI/CQI, and SB PMI/CQI) is not applied. Instead, the NR restricts the configuration of specific CSI reporting on short/long PUCCH and defines CSI omission rules. In addition, the PUSCH symbol/slot position related to the aperiodic CSI reporting timing may be dynamically indicated by DCI. In addition, candidate slot offsets may be configured by RRC signaling. For CSI reporting, a slot offset Y is configured for each reporting setting. For Uplink Shared Channel (UL-SCH), a slot offset K2 is separately configured.

Non-Terrestrial Networks Reference

Figure 6:
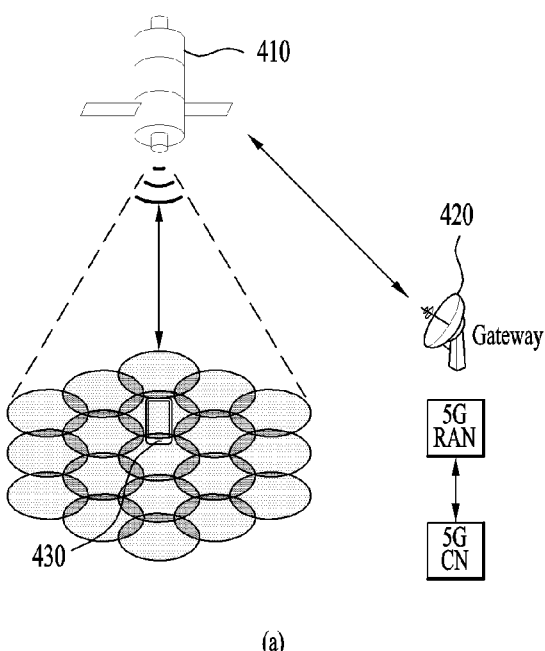
FIG. 6 illustrates a non-terrestrial network (NTN).
Figure 6:
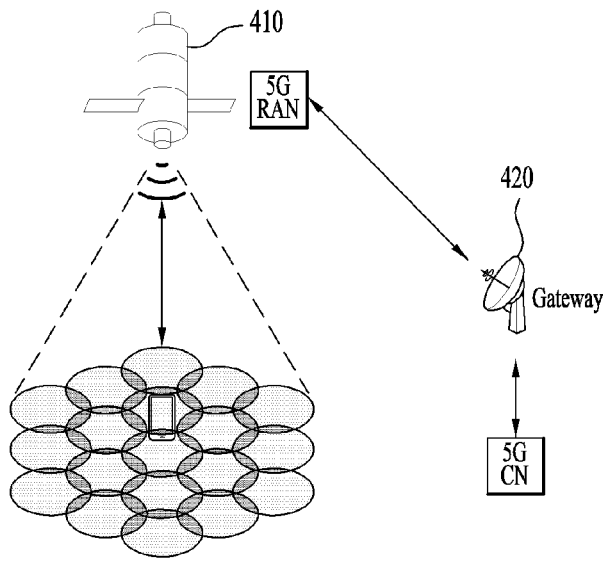

FIG. 6 illustrates a non-terrestrial network (NTN).

A non-terrestrial network (NTN) refers to a wireless network configured using satellites (e.g., geostationary earth orbit satellites (GEO)/low-earth orbit satellites (LEO)). Based on the NTN, coverage may be extended and a highly reliable network service may be provided. For example, the NTN may be configured alone, or may be combined with a conventional terrestrial network to configure a wireless communication system. For example, in the NTN network, i) a link between a satellite and a UE, ii) a link between satellites, iii) a link between a satellite and a gateway, and the like may be configured.

The following terms may be used to describe the configuration of a wireless communication system employing satellites.

Satellite: a space-borne vehicle embarking a bent pipe payload or a regenerative payload telecommunication transmitter, placed into Low-Earth Orbit (LEO) typically at an altitude between 500 km to 2000 km, Medium-Earth Orbit (MEO) typically at an altitude between 8000 to 20000 lm, or Geostationary satellite Earth Orbit (GEO) at 35 786 km altitude.

Satellite network: Network, or segments of network, using a space-borne vehicle to embark a transmission equipment relay node or base station.

Satellite RAT: a RAT defined to support at least one satellite.

5G Satellite RAT: a Satellite RAT defined as part of the New Radio.

5G satellite access network: 5G access network using at least one satellite.

Terrestrial: located at the surface of Earth.

Terrestrial network: Network, or segments of a network located at the surface of the Earth.

Use cases that may be provided by a communication system employing a satellite connection may be divided into three categories. The "Service Continuity" category may be used to provide network connectivity in geographic areas where 5G services cannot be accessed through the wireless coverage of terrestrial networks. For example, a satellite connection may be used for a UE associated with a pedestrian user or a UE on a moving land-based platform (e.g., car, coach, truck, train), air platform (e.g., commercial or private jet) or marine platform (e.g., marine vessel). In the "Service Ubiquity" category, when terrestrial networks are unavailable (due to, for example, disaster, destruction, economic situations, etc.), satellite connections may be used for IOT/public safety-related emergency networks/home access, etc. The "Service Scalability" category includes services using wide coverage of satellite networks.

For example, a 5G satellite access network may be connected to a 5G core Network. In this case, the satellite may be a bent pipe satellite or a regenerative satellite. The NR radio protocols may be used between the UE and the satellite. Also, F1 interface may be used between the satellite and the gNB.

As described above, a non-terrestrial network (NTN) refers to a wireless network configured using a device that is not fixed on the ground, such as satellite. A representative example is a satellite network. Based on the NTN, coverage may be extended and a highly reliable network service may be provided. For example, the NTN may be configured alone, or may be combined with an existing terrestrial network to configure a wireless communication system.

Use cases that may be provided by a communication system employing an NTN may be divided into three categories. The "Service Continuity" category may be used to provide network connectivity in geographic areas where 5G services cannot be accessed through the wireless coverage of terrestrial networks. For example, a satellite connection may be used for a UE associated with a pedestrian user or a UE on a moving land-based platform (e.g., car, coach, truck, train), air platform (e.g., commercial or private jet) or marine platform (e.g., marine vessel). In the "Service Ubiquity" category, when terrestrial networks are unavailable (due to, for example, disaster, destruction, economic situations, etc.), satellite connections may be used for IOT/public safety-related emergency networks/home access, etc. The "Service Scalability" category includes services using wide coverage of satellite networks.

Referring to FIG. 6, the NTN includes one or more satellites 410, one or more NTN gateways 420 capable of communicating with the satellites, and one or more UEs (/BSs) 430 capable of receiving mobile satellite services from the satellites. For simplicity, the description is focused on the example of the NTN including satellites, but is not intended to limit the scope of the present disclosure. Accordingly, the NTN may include not only the satellites, but also aerial vehicles (Unmanned Aircraft Systems (UAS) encompassing tethered UAS (TUA), Lighter than Air UAS (LTA), Heavier than Air UAS (HTA), all operating in altitudes typically between 8 and 50 km including High Altitude Platforms (HAPs)).

The satellite 410 is a space-borne vehicle equipped with a bent pipe payload or a regenerative payload telecommunication transmitter and may be located in a low earth orbit (LEO), a medium earth orbit (MEO), or a geostationary earth orbit (GEO). The NTN gateway 420 is an earth station or gateway existing on the surface of the earth, and provides sufficient RF power/sensitivity to access the satellite. The NTN gateway corresponds to a transport network layer (TNL) node.

The NTN may have i) a link between a satellite and a UE, ii) a link between satellites, iii) a link between a satellite and an NTN gateway. A service link refers to a radio link between a satellite and a UE. Inter-satellite links (ISLs) between satellites may be present when there are multiple satellites. A feeder link refers to a radio link between an NTN gateway and a satellite (or UAS platform). The gateway may be connected to a data network and may communicate with a satellite through the feeder link. The UE may communicate via the satellite and service link.

As NTN operation scenarios, two scenarios which are based on transparent payload and regenerative payload, respectively may be considered. FIG. 6-(*a*) shows an example of a scenario based on a transparent payload. In the scenario based on the transparent payload, the signal repeated by the payload is not changed. The satellites 410 repeat the NR-Uu radio interface from the feeder link to the service link (or vice versa), and the satellite radio interface (SRI) on the feeder link is NR-Uu. The NTN gateway 420 supports all functions necessary to transfer the signal of the NR-Uu interface. Also, different transparent satellites may be connected to the same gNB on the ground. FIG. 6-(*b*) shows an example of a scenario based on a regenerative payload. In the scenario based on the regenerative payload, the satellite 410 may perform some or all of the functions of a conventional BS (e.g., gNB), and may thus perform some or all of frequency conversion/demodulation/decoding/modulation. The service link between the UE and a satellite is established using the NR-Uu radio interface, and the feeder link between the NTN gateway and a satellite is established using the satellite radio interface (SRI). The SRI corresponds to a transport link between the NTN gateway and the satellite.

The UE 430 may be connected to 5GCN through an NTN-based NG-RAN and a conventional cellular NG-RAN simultaneously. Alternatively, the UE may be connected to the 5GCN via two or more NTNs (e.g., LEO NTN and GEO NTN, etc.) simultaneously.

Figure 7:
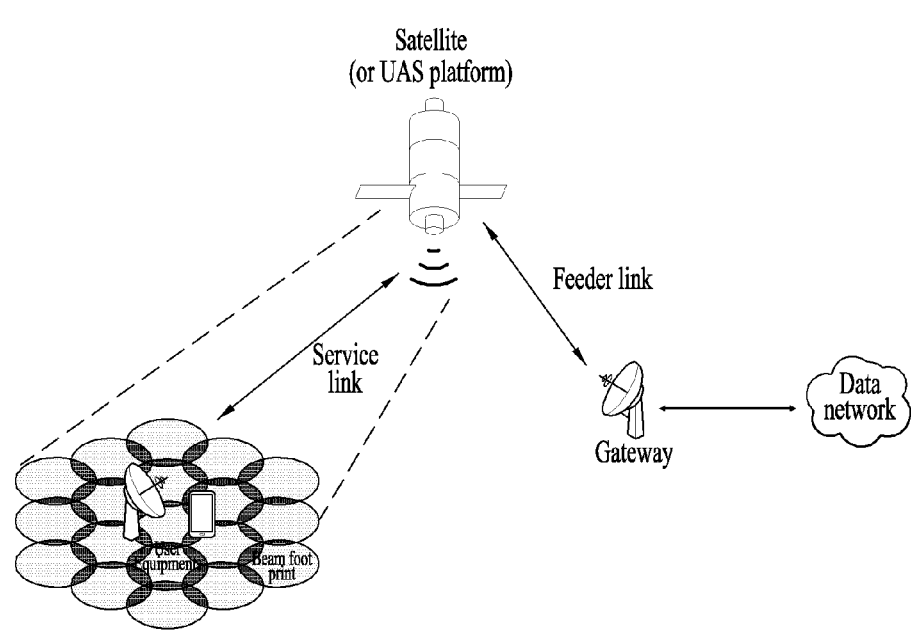
FIG. 7 illustrates an overview and a scenario of an NTN.
Figure 7:
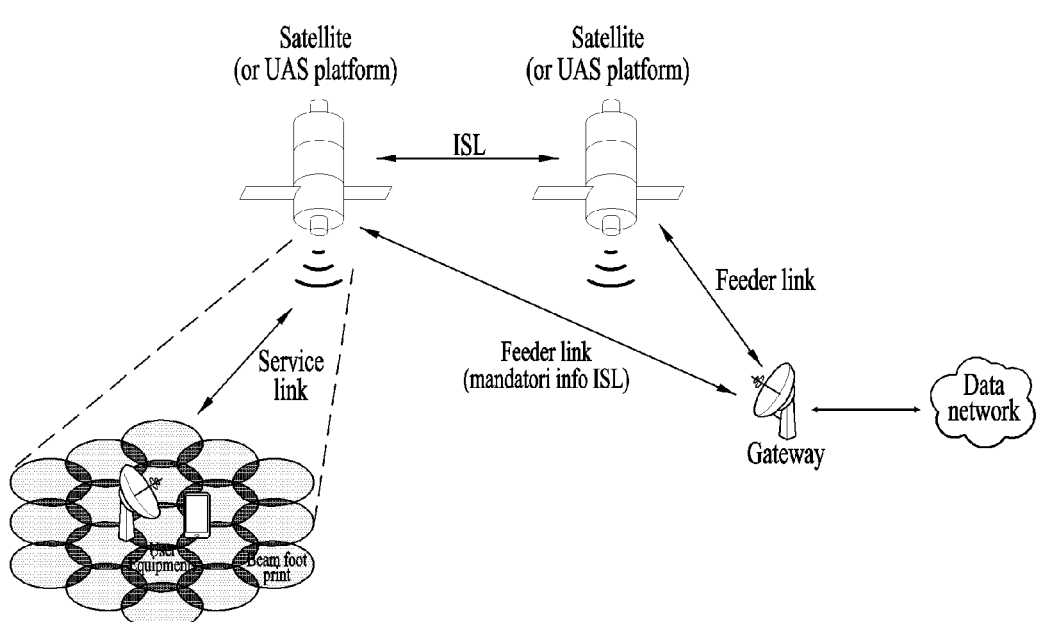

FIG. 7 illustrates an overview and a scenario of an NTN.

NTN refers to a network or network segment in which a satellite (or UAS platform) uses RF resources. Typical scenarios of the NTN providing access to a UE include an NTN scenario based on a transparent payload as shown in FIG. 7(*a*) and an NTN scenario based on a regenerative payload as shown in FIG. 7(*b*).

NTN typically features the following elements,

One or several sat-gateways that connect the Non-Terrestrial Network to a public data network A GEO satellite is fed by one or several sat-gateways which are deployed across the satellite targeted coverage (e.g. regional or even continental coverage). We assume that UE in a cell is served by only one sat-gateway.

A Non-GEO satellite served successively by one or several sat-gateways at a time. The system ensures service and feeder link continuity between the successive serving sat-gateways with sufficient time duration to proceed with mobility anchoring and hand-over.

A feeder link or radio link between a sat-gateway and the satellite (or UAS platform)

A service link or radio link between the user equipment and the satellite (or UAS platform).

A satellite (or UAS platform) which may implement either a transparent or a regenerative (with on board processing) payload. The satellite (or UAS platform) generates beams typically generate several beams over a given service area bounded by its field of view. The footprints of the beams are typically of elliptic shape. The field of view of a satellites (or UAS platforms) depends on the on board antenna diagram and min elevation angle.

A transparent payload: Radio Frequency filtering, Frequency conversion and amplification. Hence, the waveform signal repeated by the payload is un-changed;

A regenerative payload: Radio Frequency filtering, Frequency conversion and amplification as well as demodulation/decoding, switch and/or routing, coding/modulation. This is effectively equivalent to having all or part of base station functions (e.g. gNB) on board the satellite (or UAS platform).

Inter-satellite links (ISL) optionally in case of a constellation of satellites. This will require regenerative payloads on board the satellites. ISL may operate in RF frequency or optical bands.

User Equipment is served by the satellite (or UAS platform) within the targeted service area.

Table 7 below defines various types of satellites (or UAS platforms).

TABLE 7

| Platforms | Altitude range | Orbit | Typical beam footprint size |
|---|---|---|---|
| Low-Earth Orbit (LEO) satellite | 300-1500 km | Circular around the earth | 100-1000 km |
| Medium-Earth Orbit (MEO) satellite | 7000-25000 km | | 100-1000 km |

TABLE 7-continued

| Platforms | Altitude range | Orbit | Typical beam footprint size |
|---|---|---|---|
| Geostationary Earth Orbit (GEO) satellite | 35 786 km | notional station keeping position fixed in terms of elevation/azimuth | 200-3500 km |
| UAS plarform (including HAPS) | 8-50 km (20 km for HAPS) | with respect to a given earth point | 5-200 km |
| High Elliptical Orbit (HEO) satellite | 400-50000 km | Elliptical around the earth | 200-3500 km |

Typically, GEO satellite and UAS are used to provide continental, regional or local service. A constellation of LEO and MEO is used to provide services in both Northern and Southern hemispheres. In some case, the constellation can even provide global coverage including polar regions. For the later, this requires appropriate orbit inclination, sufficient beams generated and inter-satellite links.

Typically, GEO satellite and UAS are used to provide continental, regional or local service. A constellation of LEO and MEO is used to provide services in both Northern and Southern hemispheres. In some case, the constellation can even provide global coverage including polar regions. For the later, this requires appropriate orbit inclination, sufficient beams generated and inter-satellite links HEO satellite systems are not considered in NTN.

An NTN that provides access to a terminal in six reference scenarios described below can be considered.

Circular orbiting and notional station keeping platforms.

Highest RTD constraint
Highest Doppler constraint
A transparent and a regenerative payload
One ISL case and one without ISL. Regenerative payload is mandatory in the case of inter-satellite links
Fixed or steerable beams resulting respectively in moving or fixed beam foot print on the ground
Six scenarios are considered as depicted in Table 8 and are detailed in Table 9.

TABLE 8

| | Transparent satellite | Regenerative satellite |
|---|---|---|
| GEO based non-terrestrial access network | Scenario A | Scenario B |
| LEO based non-terrestrial access network: steerable beams | Scenario C1 | Scenario D1 |
| LEO based non-terrestrial access network: the beams move with the satellite | Scenario C2 | Scenario D2 |

TABLE 9

| Scenarios | GEO based non-terrestrial access network (Scenario A and B) | LEO based non-terrestrial access network (Scenario C & D) |
|---|---|---|
| Orbit type | notional station keeping position fixed in terms of elevation/azimuth with respect to a given earth point | circular orbiting around the earth |
| Altitude | 35,786 km | 600 km 1,200 km |
| Spectrum (service link) | <6 GHz (e.g. 2 GHz) >6 GHz (e.g. DL 20 GHz, UL 30 GHz) | |
| Max channel bandwidth capability (service link) | 30 MHz for band <6 GHz 1 GHz for band >6 GHz | |
| Payload | Scenario A: Transparent (including radio frequency function only) Scenario B: regenerative (including all or part of RAN functions) | Scenario C: Transparent (including radio frequency function only) Scenario D: Regenerative (including all or part of RAN functions) |
| Inter-Satellite link | No | Scenario C: No Scenario D: Yes/No (Both cases are possible.) |
| Earth-fixed beams | Yes | Scenario C1: Yes (steerable beams), see note 1 Scenario C2: No (the beams move with the satellite) Scenario D 1: Yes (steerable beams), see note 1 Scenario D 2: No (the beams move with the satellite) |
| Max beam foot print size (edge to edge) regardless of the elevation angle | 3500 km (Note 5) | 1000 km |
| Min Elevation angle for both sat-gateway and user equipment | 10° for service link and 10° for feeder link | 10° for service link and 10° for feeder link |

TABLE 9-continued

| Scenarios | GEO based non-terrestrial access network (Scenario A and B) | LEO based non-terrestrial access network (Scenario C & D) |
|---|---|---|
| Max distance between satellite and user equipment at min elevation angle | 40,581 km | 1,932 km (600 km altitude) 3,131 km (1,200 km altitude) |
| Max Round Trip Delay (propagation delay only) | Scenario A: 541.46 ms (service and feeder links) Scenario B: 270.73 ms (service link only) | Scenario C: (transparent payload: service and feeder links) 25.77 ms (600 km) 41.77 ms (1200 km) Scenario D: (regenerative payload: service link only) 12.89 ms (600 km) 20.89 ms (1200 km) |
| Max differential delay within a cell (Note 6) | 10.3 ms | 3.12 ms and 3.18 ms for respectively 600 km and 1200 km |
| Max Doppler shift (earth fixed user equipment) | 0.93 ppm | 24 ppm (600 km) 21 ppm(1200 km) |
| Max Doppler shift variation (earth fixed user equipment) | 0.000045 ppm/s | 0.27 ppm/s (600 km) 0.13 ppm/s(1200 km) |
| User equipment motion on the earth | 1200 km/h (e.g. aircraft) | 500 km/h (e.g. high speed train) Possibly 1200 km/h (e.g. aircraft) |
| User equipment antenna types | Omnidirectional antenna (linear polarisation), assuming 0 dBi Directive antenna (up to 60 cm equivalent aperture diameter in circular polarisation) | |
| User equipment Tx power | Omnidirectional antenna: UE power class 3 with up to 200 mW Directive antenna: up to 20 W | |
| User equipment Noise figure | Omnidirectional antenna: 7 dB Directive antenna: 1.2 dB | |
| Service link | 3GPP defined New Radio | |
| Feeder link | 3GPP or non-3GPP defined Radio interface | 3GPP or non-3GPP defined Radio interface |

NOTE 1:
Each satellite has the capability to steer beams towards fixed points on earth using beamforming techniques. This is applicable for a period of time corresponding to the visibility time of the satellite
NOTE 2: Max delay variation within a beam (earth fixed user equipment) is calculated based on Min Elevation angle for both gateway and user equipment
NOTE 3:
Max differential delay within a beam is calculated based on Max beam foot print diameter at nadir
NOTE 4:
Speed of light used for delay calculation is 299792458 m/s.
(NOTE 5):
The Maximum beam foot print size for GEO is based on current state of the art GEO High Throughput systems, assuming either spot beams at the edge of coverage (low elevation).
(NOTE 6):
The maximum differential delay at cell level has been computed considering the one at beam level for largest beam size. It doesn't preclude that cell may include more than one beam when beam size are small or medium size. However the cumulated differential delay of all beams within a cell will not exceed the maximum differential delay at cell level in the table above.

The NTN study results apply to GEO scenarios as well as all NGSO scenarios with circular orbit at altitude greater than or equal to 600 km.

Hereinafter, the NTN reference point will be described.

Figure 8:
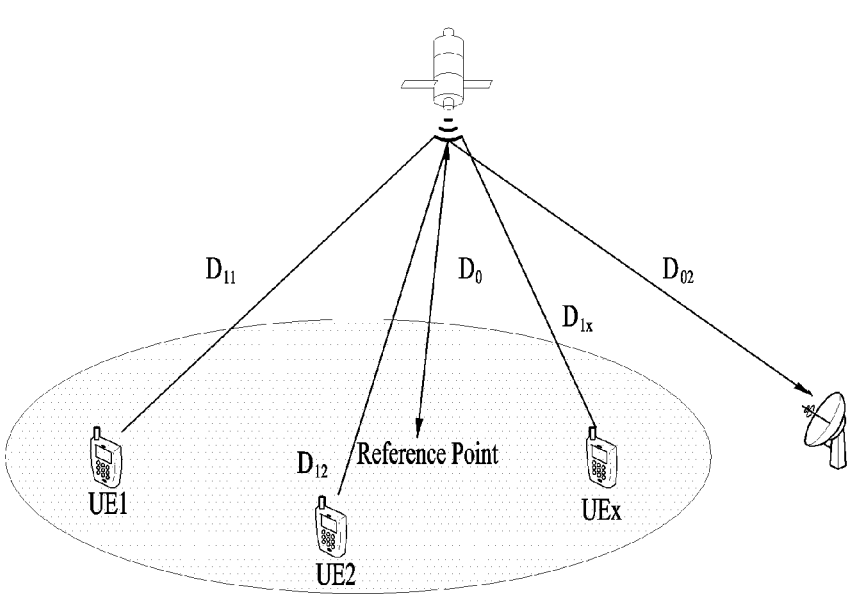
FIG. 8 illustrates TA components of the NTN.

FIG. 8 illustrates TA components of the NTN. Here, the TA offset (NTAoffset) may not be plotted.

With consideration on the larger cell coverage, long round trip time (RTT) and high Doppler, enhancements are considered to ensure the performance for timing and frequency synchronization for UL transmission.

Referring to FIG. 8, a reference point related to timing advance (TA) of initial access and subsequent TA maintenance/management is illustrated. Terms defined in relation to FIG. 8 are described below.

Option 1: Autonomous Acquisition of the TA at UE with UE Known Location and Satellite Ephemeris.

Regarding option 1, the required TA value for UL transmission including PRACH can be calculated by the UE. The corresponding adjustment can be done, either with UE-specific differential TA or full TA (consisting of UE specific differential TA and common TA).

Except the full TA compensation at the UE side, both the alignment on the UL timing among UEs and DL and UL frame timing at network side can be achieved. However, in case of satellite with transparent payload, further discussion on how to handle the impact introduced by feeder link will be conducted in normative work. Additional needs for the network to manage the timing offset between the DL and UL frame timing can be considered, if impacts introduced by feeder link is not compensated by UE in corresponding compensation.

Except the UE specific differential TA only, additional indication on a single reference point should be signalled to UEs per beam/cell for achieving the UL timing alignment among UEs within the coverage of the same beam/cell Timing offset between DL and UL frame timing at the network side should also be managed by the network regardless of the satellite payload type.

With concern on the accuracy on the self-calculated TA value at the UE side, additional TA signalling from network to UE for TA refinement, e.g., during initial access and/or TA maintenance, can be determined in the normative work.

Option 2: Timing Advanced Adjustment Based on Network Indication

Regarding option 2, the common TA, which refers to the common component of propagation delay shared by all UEs within the coverage of same satellite beam/cell, is broadcasted by the network per satellite beam/cell. The calculation of this common TA is conducted by the network with assumption on at least a single reference point per satellite beam/cell.

The indication for UE-specific differential TA from network as the Rel-15 TA mechanism is also needed. For satisfying the larger coverage of NTN, extension of value range for TA indication in RAR, either explicitly or implicitly, is identified. Whether to support negative TA value in corresponding indication will be determined in the normative phase. Moreover, indication of timing drift rate, from the network to UE, is also supported to enable the TA adjustment at UE side.

For calculation of common TA in the above two options, single reference point per beam is considered as the baseline. Whether and how to support the multiple reference points can be further discussed in the normative work.

For the UL frequency compensation, at least for LEO system, the following solutions are identified with consideration on the beam specific post-compensation of common frequency offset at the network side:

Regarding option 1, both the estimation and pre-compensation of UE-specific frequency offset are conducted at the UE side. The acquisition of this value can be done by utilizing DL reference signals, UE location and satellite ephemeris.

Regarding option 2, the required frequency offset for UL frequency compensation at least in LEO systems is indicated by the network to UE. The acquisition on this value can be done at the network side with detection of UL signals, e.g., preamble.

Indication of compensated frequency offset values by the network is also supported in case that compensation of the frequency offset is conducted by the network in the uplink and/or the downlink, respectively. However, indication of Doppler drift rate is not necessary.

Hereinafter, more delay-tolerant re-transmission mechanisms will be described in detail.

As follows, two main aspects of a retransmission mechanism with improved delay tolerance can be discussed.

Disabling of HARQ in NR NTN

HARQ optimization in NR-NTN

HARQ Round Trip Time in NR is of the order of several ms. The propagation delays in NTN are much longer, ranging from several milliseconds to hundreds of milliseconds depending on the satellite orbit. The HARQ RTT can be much longer in NTN. It was identified early in the study phase that there would be a need to discuss potential impact and solutions on HARQ procedure. RAN1 has focused on physical layer aspects while RAN2 has focused on MAC layer aspects.

In this regard, disabling of HARQ in NR NTN may be considered.

It was discussed that when UL HARQ feedback is disabled, there could be issues if ① MAC CE and RRC signalling are not received by UE, or ② DL packets not correctly received by UE for a long period of time without gNB knowing it.

The following were discussed without convergence on the necessity of introducing such solutions for NTN when HARQ feedback is disabled (1) Indicate HARQ disabling via DCI in new/re-interpreted field [60], [61]

(2) New UCI feedback for reporting DL transmission disruption and or requesting DL scheduling changes [62], [63]

The following possible enhancements for slot-aggregation or blind repetitions were considered. There is no convergence on the necessity of introducing such enhancements for NTN.

(1) Greater than 8 slot-aggregation [64]

(2) Time-interleaved slot aggregation [65]

(3) New MCS table [66]

Next, a method for optimizing HARQ for the NR NTN will be described.

Solutions to avoid reduction in peak data rates in NTN were discussed. One solution is to increase the number of HARQ processes to match the longer satellite round trip delay to avoid stop-and-wait in HARQ procedure. Another solution is to disable UL HARQ feedback to avoid stop-and-wait in HARQ procedure and rely on RLC ARQ for reliability. The throughput performance for both types of solutions was evaluated at link level and system level by several contributing companies.

The observations from the evaluations performed on the effect of the number of HARQ processes on performance are summarized as follows:

Three sources [72][64][70] provided link-level simulations of throughput versus SNR with the following observations:

One source simulated with a TDL-D suburban channel with elevation angle of 30 degrees with BLER target of 1% for RLC ARQ with 16 HARQ processes, and BLER targets 1% and 10% with 32/64/128/256 HARQ processes. There was no observable gain in throughput with increased number of HARQ processes compared to RLC layer re-transmission with RTT in {32, 64, 128, 256} ms.

One source simulated with a TDL-D suburban channel with elevation angle of 30 degrees with BLER targets of 0.1% for RLC ARQ with 16 HARQ processes, and BLER targets 1% and 10% with 32 HARQ processes. An average throughput gains of 10% was observed with 32 HARQ processes compared to RLC ARQ with 16 HARQ processes with RTT=32 ms.

One source provides the simulation results in following cases with RTT=32 ms, e.g., assuming BLER targets at 1% for RLC ARQ with 16 HARQ processes, BLER targets 1% and 10% with 32 HARQ processes. There is no observable gain in throughput with 32 HARQ processes compared to RLC ARQ with 16 HARQ processes in case that channel is assumed as TDL-D with delay spread/K-factor taken from system channel model in suburban scenario with elevation angle 30. Performance gain can be observed with other channels, especially, up to 12.5% spectral efficiency gain is achieved in case that channel is assumed as TDL-A in suburban with 30° elevation angle. Moreover, simulation based on the simulation with consideration on other scheduling operations: (i) additional MCS offset, (ii) MCS table based on lower efficiency (iii) slot aggregation with different BLER targets are conducted. Significant gain can be observed with enlarging the HARQ process number.

One source [73] provided system level simulations for LEO=1200 km with 20% resource utilization, 16 and 32 HARQ processes, 15 and 20 UEs per cell, proportional fair scheduling, and no frequency re-use. The spectral efficiency gain per user with 32 HARQ processes compared to 16 HARQ processes depends on the number of UEs. With 15 UEs per beam, an average spectral efficiency gain of 12% at 50% per centile is observed. With 20 UEs per cell there is no observable gain.

The following options were considered with no convergence on which option to choose:

Option A: Keep 16 HARQ process IDs and rely on RLC ARQ for HARQ processes with UL HARQ feedback disabled via RRC Option B: Greater than 16 HARQ process IDs with UL HARQ feedback enabled via RRC with following consideration. In this case, in the case of 16 or more HARQ process IDs, maintenance of a 4-bit HARQ process ID field in UE capability and DCI may be considered.

Alternatively, the following solutions may be considered for 16 or more HARQ processes keeping the 4-bit HARQ process ID field in DCI:

Slot number based [62], [67], [68], [60], [69]

Virtual process ID based with HARQ re-transmission timing restrictions [61]

Reuse HARQ process ID within RTD (time window) [69]

Re-interpretation of existing DCI fields with assistance information from higher layers [70]

One source also considered solutions where the HARQ process ID field is increased beyond 4 bits [65]

With regards to HARQ enhancements for soft buffer management and stop-and-wait time reduction, the following options were considered with no convergence on which, if any, of the options, to choose:

Option A-1: Pre-active/pre-emptive HARQ to reduce stop-and-wait time

Option A-2: Enabling/disabling of HARQ buffer usage configurable on a per UE and per HARQ process [67], [64], [69]

Option A-3: HARQ buffer status report from the UE [67]

The number of HARQ processes with additional considerations for HARQ feedback, HARQ buffer size, RLC feedback, and RLC ARQ buffer size should be discussed further when specifications are developed.

Figure 9:
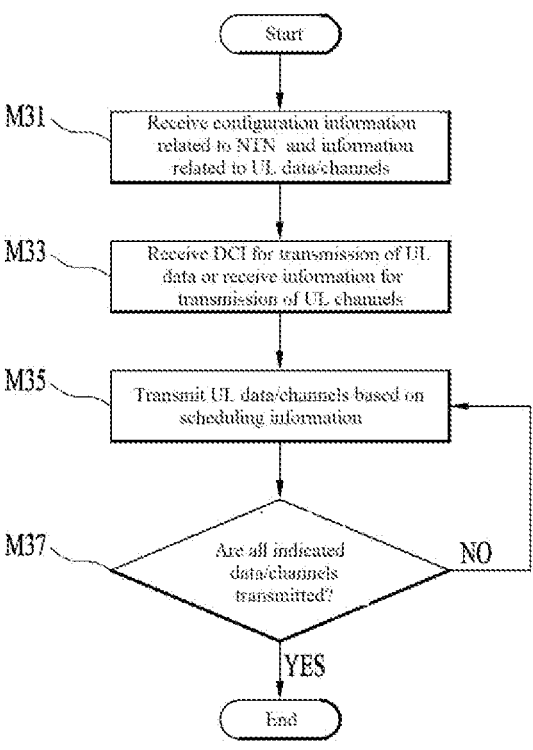
FIG. 9 is a flowchart illustrating a method for a user equipment (UE) to transmit an uplink (UL) signal in an NTN according to an embodiment.
Figure 10:
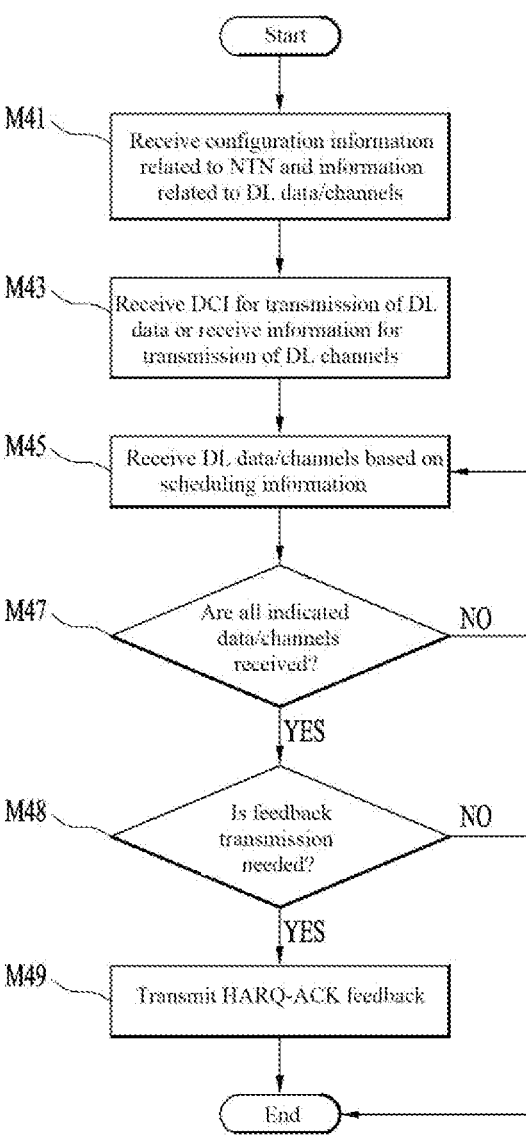
FIG. 10 is a flowchart illustrating a method for a UE to receive a downlink (DL) signal in an NTN according to an embodiment.

FIG. 9 is a flowchart illustrating a method for a UE to transmit a UL signal in an NTN according to an embodiment, and FIG. 10 is a flowchart illustrating a method for a UE to receive a DL signal in an NTN according to an embodiment.

At least one of the steps shown in FIGS. 9 and 10 may be omitted depending on situations or configurations, and the steps shown in FIGS. 9 and 10 are merely for convenience of explanation and thus do not limit the scope of the present disclosure.

Referring to FIG. 9, the UE may receive NTN related configuration information and UL data/channel related information (M31). Next, the UE may receive DCI/control information for transmission of UL data/channels (M33). The DCI/control information may include scheduling information for transmission of the UL data/channels. Then, the UE may transmit the UL data/channels based on the scheduling information (M35). The UE may perform UL transmission until all the configured/indicated UL data/channels are transmitted. When all the UL data/channels are transmitted, the UE may terminate the corresponding UL transmission (M37).

Referring to FIG. 10, the UE may receive NTN related configuration information and DL data/channel related information (M41). Next, the UE may receive DCI/control information for reception of DL data/channels (M43). The DCI/control information may include scheduling information of the DL data/channels. The UE may receive the DL data/channels based on the scheduling information (M45). The UE may receive DL data/channels until all the configured/indicated DL data/channels are received. When all DL data/channels are received, the UE may determine whether feedback information for the received DL data/channels is required (M47 and M48). If the UE needs to transmit the feedback information, the UE may transmit HARQ-ACK feedback (or HARQ feedback). Otherwise, the UE may terminate the reception operation without transmitting the HARQ-ACK feedback (M49).

Figure 11:
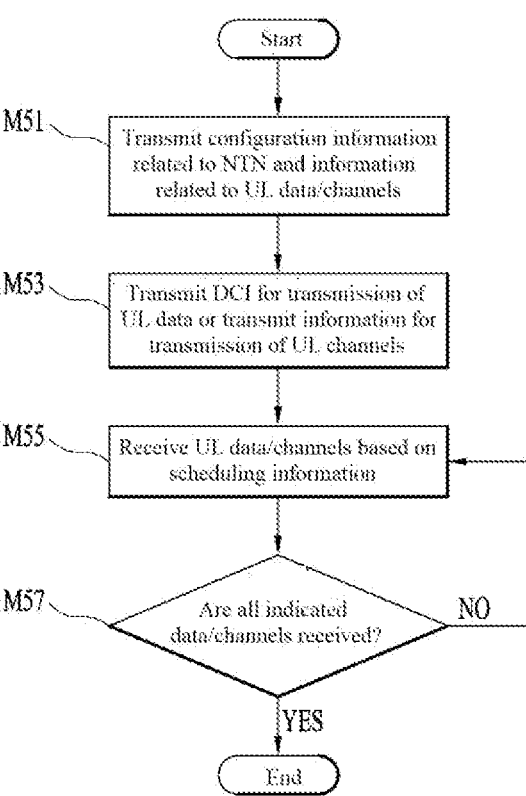
FIG. 11 is a flowchart illustrating a method for a base station (BS) to receive a UL signal in an NTN according to the above-described embodiment.
Figure 12:
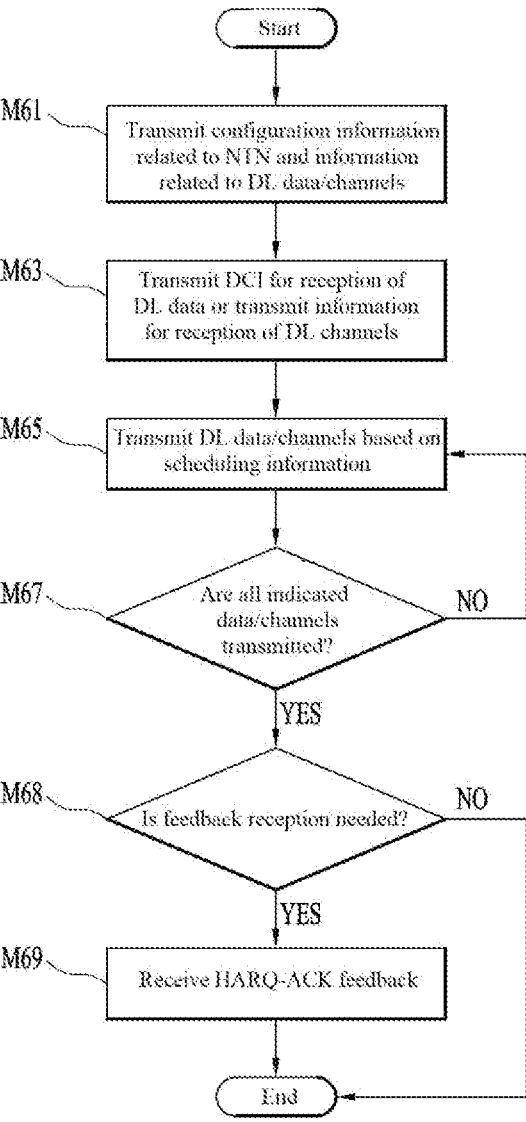
FIG. 12 is a flowchart illustrating a method for a BS to transmit a DL signal in an NTN according to the above-described embodiment.

FIG. 11 is a flowchart illustrating a method for a BS to receive a UL signal in an NTN according to an embodiment, and FIG. 12 is a flowchart illustrating a method for a BS to transmit a DL signal in an NTN according to an embodiment. At least one of the steps shown in FIGS. 11 and 12 may be omitted depending on situations or configurations, and the steps shown in FIGS. 11 and 12 are merely for convenience of explanation and thus do not limit the scope of the present disclosure.

Referring to FIG. 11, the BS may transmit NTN related configuration information, UL data/channel related information to the UE (M51). Thereafter, the BS may transmit (to the UE) DCI/control information for transmission of UL data and/or UL channels (M53). The DCI/control information may include scheduling information for the UE to transmit the UL data/channels. The BS may receive (from the UE) the UL data/channels transmitted based on the scheduling information (M55). The BS may perform UL reception operation until all the configured/indicated UL data/channels are received. When all the UL data/channels are received, the BS may terminate the corresponding UL reception (M57).

Referring to FIG. 12, the BS may transmit NTN related configuration information and DL data/channel related information (to the UE) (M61). Thereafter, the BS may transmit (to the UE) DCI/control information for reception of DL data/channels (M63). The DCI/control information may include scheduling information on the DL data/channels. The BS may transmit the DL data/channels (to the UE) based on the scheduling information (M65). The BS may perform DL transmission until all configured/indicated DL data/channels are transmitted. When the BS transmits all DL data/channels, the BS may determine whether the BS needs to receive feedback information for the DL data/channels (M67 and M68). When the BS needs to receive the feedback information, the BS may receive HARQ-ACK feedback. Otherwise, the BS may terminate the DL transmission without receiving the HARQ-ACK feedback (M69).

EMBODIMENTS

The above contents (e.g., NR frame structure, NTN system, etc.) are applicable in combination with methods proposed in the present disclosure, which will be described later. Alternatively, the contents may clarify the technical features of the methods proposed in the present disclosure.

Methods for HARQ disabling, which will be described later, are related to UL signal transmission, and the methods may be equally applied to DL signal transmission in the above-described NR or LTE system. Thus, it is obvious that the terms, expressions, and structures in this document may be modified to be suitable for the above-described system in order to implement the technical idea of the present disclosure in the corresponding system.

To guarantee wide coverage or provide wireless communication services in a place where it is not easy to install BSs for wireless communication, it is considered to provide a NR NTN or a LTE NTN. In legacy terrestrial network (TN) services such as NR and LTE services, a BS may be installed on the ground to provide wireless communication services to UEs. Instead of installing BSs on the ground, the NTN provides wireless communication services to UEs by installing BSs on non-terrestrial locations such as satellites (geostationary orbit, low orbit, medium orbit, etc.), airplanes, unmanned aerial vehicles, drones, etc.

Frequency bands considered for NR NTN service are a band of 2 GHz (S-band: 2 to 4 GHz) in bands below 6 GHz and a DL band of 20 GHz and a UL band of 30 GHz (Ka-Band: 26.5 to 40 GHz) in bands above 6 GHz.

In the worst scenario (GEO scenario A) shown in Table 9 above, the delay may increase up to 540 ms. In this case, a latency problem may occur due to a large delay when the UE performs HARQ feedback.

The present disclosure relates to a method for effectively performing a CSI reporting in a channel environment having long latency and a wide difference in loss due to Line-Of-Sight/Non-LOS (LOS/NLOS) in a wireless communication system including NTN.

As a method for alleviating a channel aging effect caused by a long feedback delay, the most conventional approach is to predict/estimate a future channel state in advance and report the predicted channel state information to a base station. In this case, if the future channel state prediction is accurate, robust feedback and/or DL signal transmission for channel aging becomes possible. On the other hand, if the future channel state prediction is inaccurate, it causes a problem of error propagation due to inaccurate channel state prediction, which may result in worse results than not feeding backchannel state information. In the case of NTN (specifically, LEO), it is expected to be somewhat possible to report a CSI based on predictions (i.e., predictions of future channel states) if a UE is able to acquire orbit information of a satellite (e.g., speed, location information, time, etc.). On the other hand, LOS is not secured due to clouds, rain, and other geographic/terrain features between a satellite and a UE, so when a channel is measured based on NLOS, NLOS has more performance degradation than LOS (e.g., 12-15 dB degradation), it may be difficult to measure and report a CSI based on prediction. However, as mentioned above, since most of the situations in which LOS is secured are difficult to predict, it is necessary to improve the CSI reporting method.

Meanwhile, due to the long Round Trip Delay (RTD) between a link (e.g., access link) between a satellite and a UE and/or a link (e.g., feeder link) between a satellite and a gateway or a base station, an operation of disabling (or deactivating) HARQ feedback is being considered in NTN. Yet, when HARQ feedback is disabled, it may be difficult for the base station to properly configure MCS because the base station is unable to know exactly which packet or Transport Block (TB) is successfully decoded by the UE. Hereinafter, methods for solving the above-described problems are proposed.

Proposal 1

According to a proposed embodiment, a UE may report decoding information (e.g., PDSCH/PDCCH reception information) on a latest N slots (or symbols/sub-slots) to a base station (e.g. gNB) based on a specific timing point. In this case, the decoding information may mean information indicating whether decoding is successful. For example, the decoding information may include not only information that explicitly indicates the success/failure of decoding through a specific value, but also information that implicitly indicates it. In addition, the UE may report the decoding information as a CSI to the base station. For example, the UE may transmit the decoding information in a manner of adding it to the existing information reported as a CSI, or report the decoding information as a CSI to the base station by omitting some of the existing information reported as a CSI, by which the present disclosure is non-limited. In addition, the specific timing point may be agreed in advance between the base station and the UE. For example, the specific timing point may be determined before M slots (or symbols/sub-slots) from a CSI reporting timing point X, a CSI reporting triggered timing point, or a timing point of receiving a CSI reporting triggering signal (e.g., DCI), by which the present disclosure is non-limited. For example, the UE may report the decoding information on the latest N slots (or symbols/sub-slots) from the time before the M slots (or symbols/sub-slots) of the CSI reporting timing point X to the base station. Alternatively, the UE may report decoding information on the latest N slots (or sub-slots) from the CSI reporting triggered timing point (or a timing point of receiving the CSI reporting triggering signal (or DCI)) to the base station. In this case, the symbol may mean an OFDM symbol, but is not limited thereto. The N and M are natural numbers of 1 or more, and may be the values agreed in advance between the base station and the UE or the values configured by the base station to the UE. In this case, the M value may be configured or indicated to the UE in conjunction with a K_offset value. For example, the M value may be configured or indicated in the form of a function of K_offset. The K_offset value is a timing offset value to complement the long RTD of NTN, which was agreed in the NTN study phase. The following Table 10 is extracted from the items agreed in the NTN study phase for the K_offset value.

TABLE 10

Agreement:
For UL transmission timing, introduce an offset $K_{offset}$ for NR NTN.
For UL HARQ-ACK on PUCCH, where HARQ ACK on PUCCH is transmitted on slot $n + K_1 + K_{offset}$ when a scheduling DCI is received in slot n.
For UL transmission on PUSCH, where PUSCH is transmitted on slot $\lfloor (n \cdot 2^{\mu PUSCH - \mu PDCCH}) \rfloor + K_2 + K_{offset}$ when a scheduling DCI is received in slot n.
For CSI transmission on PUSCH, where CSI on PUSCH is transmitted on slot $n + K + K_{offset}$, when the DCI with CSI request is received in slot n and K is selected by the DCI.
For a CSI report in uplink slot n', the CSI reference resource is given in downlink slot $n - n_{CSI\_ref} - K_{offset}$, where $n = \left\lfloor n' \cdot \frac{2^{\mu_{DL}}}{2^{\mu_{UL}}} \right\rfloor$ and $n_{CSI\_ref}$ is as defined in 38.214.

$K_{offset}$ is per beam or per-cell
FFS: Whether $K_{offset}$ is derived from broadcast information or is signaled by higher layers
Agreement:
With reference to slots for a PUSCH transmission scheduled by a RAR UL grant, if a UE receives a PDSCH with a RAR message ending in slot n for a corresponding PRACH transmission from the UE, the UE transmits the PUSCH in slot $n + K_2 + \Delta + K_{offset}$.
Agreement:
When the HARQ-ACK corresponding to a PDSCH carrying a MAC-CE command is transmitted in slot n, the corresponding action and the UE assumption on the downlink configuration indicated by the MAC-CE command shall be applied starting from the first slot that is after slot $n + XN_{slot}^{subframe,\mu} + K_{offset}$

TABLE 10-continued (X can be determined when specifications are developed).
Agreement:
If a UE receives a DCI triggering aperiodic SRS in slot n, the UE
transmits aperiodic SRS in each of the triggered SRS resource sets(s)
in slot $$\left\lfloor n \cdot 2^{\frac{\mu_{PSHS}}{\mu_{PDCCH}}} \right\rfloor + k + K_{offset}.$$

Agreement:
$K_{offsst}$ may take different values for each of the identified timing
relationships that need to be modified for NTN.

A bitmap format may be considered as the CSI reporting format of the above-described proposal 1. In this case, each bit of the bitmap may indicate success/failure in decoding of each slot. For example, if N=100 is configured or agreed, the UE may use 100 bits to indicate success/failure in decoding of 100 slots, and report the corresponding 100 bits to the base station. In this case, each bit of the 100 bits may indicate success/failure in decoding of each of the 100 slots. For example, if a bit value is 1, it may be expressed as success. If the bit value is 0, it may be expressed as failure. In this case, a PDCCH for scheduling a specific PDSCH may be assumed/agreed to be 100% successful in decoding, and may be limited to decoding information on the corresponding latest N slots.

Alternatively, according to an embodiment, if the bit value is 1, it may represent success in reception of PDSCH. If the bit value is 0, it may represent failure in reception of PDSCH. In this case, the failure in the reception of the PDSCH may inclusively mean a decoding failure of the PDSCH, a decoding failure of the PDCCH for scheduling the PDSCH, and a reception failure of PDCCH.

As another embodiment, whether decoding of each slot (or sub-slot) is successful may be indicated using 2 bits. For example, the two bits may contain information on both PDCCH for scheduling a specific slot and success or failure in decoding PDSCH scheduled by the PDCCH. For example, if the 2-bit value is '00', it means a decoding success of PDCCH and a decoding success of PDSCH. If the 2-bit value is '01', it means a decoding success of PDCCH and a decoding failure of PDSCH. If the 2-bit value is '10', it means a decoding failure of PDCCH (PDCCH not detected). If the 2-bit value is '11', it may be set to 'reserved'. Alternatively, if '00', it may be set as a decoding failure of PDCCH and a decoding failure of PDSCH. If '01', it may be set as a decoding failure of PDCCH (PDCCH not detected). If '10', it may be set as a decoding success of PDCCH and a decoding failure of PDSCH. If '11', it may be set as a decoding success of PDCCH and a decoding success of PDSCH (or 'reserved').

When Proposal 1 is associated with a specific PDCCH, decoding information on N slots may be decoding information on the N slots from a reception timing point of PDSCH scheduled by the PDCCH. In this case, if a PDSCH period is longer than an N-slot period, decoding information on the N slots may be reported in a manner of being mapped to a specific code point indicating, for example, a decoding failure of the PDCCH and a decoding failure of the PDSCH.

In addition, in Proposal 1, the base station may be configured to report separately a case that HARQ feedback is enabled (or activated) and a case that HARQ feedback is disabled.

That is, according to the proposed embodiment, the UE may receive control information for disabling HARQ feedback, and may receive a downlink signal based on the HARQ feedback disabled by the control information. The UE may transmit information, which indicates whether decoding of the received downlink signal has been successful, as a CSI based on a preconfigured timing point. In this case, the information on whether decoding is successful may correspond to the decoding information described above. Specifically, the information on whether the decoding was successful may include information on whether the decoding of the downlink signal was successful during the latest N (N is a natural number of 1 or more) time units from a preconfigured timing point. For example, the preconfigured timing point may include, but is not limited to, a timing point before M (M is a natural number of 1 or more) time units, a timing point when a CSI reporting is triggered, or a timing point when control information to trigger a CSI reporting is received. In addition, the preconfigured timing point may mean a timing point set by the base station or a timing point agreed in advance between the base station and the UE. In addition, the M described above may be determined based on a timing offset value set for NTN.

As described above, the information on whether the decoding of the downlink signal is successful may be expressed as bitmap information, and each bit of the bitmap information may indicate whether the decoding of the downlink signal is successful in each of the N time units. Alternatively, according to an embodiment, whether the decoding of the downlink signal is successful in each of the N time units may be expressed as two bits of the bitmap information. In this case, the 2 bits may indicate whether decoding of PDSCH received in each of the N time units and PDCCH for scheduling the PDSCH is successful.

In the above-described example, the time unit may refer to a slot, a sub-slot, or a symbol unit. A symbol may refer to an OFDM symbol, but is not limited thereto. In addition, the downlink signal may include the above-described PDCCH and/or PDSCH (scheduled by the PDCCH).

Additionally, the CSI described above may further include information indicating whether a channel is a Line Of Sight (LOS) environment or a Non-LOS (NLOS) environment according to Proposal 4 described below. In this case, whether the channel is the LOS environment or the NLOS environment may mean whether the LOS is secured or not from a channel on which the UE and the base station communicate with each other.

Based on the information reported from the UE, the base station according to the proposed embodiment may know statistical information on decoding success/failure of a DL signal (e.g., PDCCH and/or PDSCH) of the UE, and may configure an appropriate MCS based on the statistical information.

In addition, the UE according to the proposed embodiment may report decoding information according to Proposal 1 and/or information on how many times DCI/PDSCH was indicated or successfully decoded during the latest N slots (or symbols/sub-slots) to the base station.
Proposal 2

A UE according to a proposed embodiment may report decoding probability information of a DL signal to a base station at a specific timing point Z. Proposal 2 is a modified embodiment of Proposal 1, and may be used to prevent a payload size of a CSI from increasing according to an N value and to report a compact CSI. For example, the UE may report decoding probability information of a DL signal to the base station using 6 bits. In this case, the decoding probability information may mean probability information on whether decoding is successful. For example, a reported 6-bit value may be determined as shown in Table 11 below. Referring to Table 11, when the 6-bit value is "000000", the probability of success in decoding may be 0%. When the 6-bit value is "111111", the probability of success in decoding may be 63/64%.

TABLE 1

| State | Probability (%) |
|-------|-----------------|
| 000000 | 0 |
| 000001 | 1/64 |
| 000010 | 2/64 |
| . | |
| . | |
| . | |
| 1111110 | 62/64 |
| 1111111 | 63/64 |

When Table 11 is extended, decoding probability information of a DL signal may be configured using the generalized Y bits as shown in Table 12. In this case, the Y value may be a value configured by the base station to the UE or a value agreed between the base station and the UE.

TABLE 12

| State | Probability (%) |
|-------|-----------------|
| All Y bits are 0 | 0 |
| First Y-1 bits are 0 and last 1 bit is 1 | $1/2^Y$ |
| First Y-2 bits are 0 and last 2 bits are 10 | $2/2^Y$ |
| . | |
| . | |
| . | |
| First Y-1 bits are 1 and last 1 bit is 0 | $(2^Y-2)/2^Y$ |
| All Y bits are 1 | $(2^Y-1)/2^Y$ |

According to one embodiment, the base station may configure decoding probability information on PDCCH and PDSCH to be reported independently. In addition, the base station may configure decoding probability information to be reported in a manner of distinguishing an HARQ feedback enabled case and an HARQ feedback disabled case from each other. In addition, the base station may configure information on an MCS set, which is to be reported by the UE, in advance to receive decoding probability information corresponding to a specific MCS, and the UE may report decoding probability information to the base station for each MCS included in the configured MCS set.

In this case, the specific timing point Z may be: i) a CSI reporting timing point; or ii) a CSI reporting triggered timing point+ alpha. In this case, the alpha may be a specific positive value, and a unit of the alpha value may be a slot/sub-slot/symbol (for example, OFDM symbol) unit. The decoding probability information to be reported by the UE may be a cumulative decoding probability from an initial access step to the specific timing point Z, or a decoding probability in a specific interval (i.e., an interval in which decoding probability is calculated) configured by the base station. In this case, the decoding probability may mean a probability of success in decoding. For example, the specific interval may be set to an interval prior to the X slots (or symbols/sub-slots) with reference to the specific timing point Z, and the X may be a predefined value or a value configured by the base station.

Namely, according to the proposed embodiment, the information on whether the decoding of the downlink signal is successful in Proposal 1 may include a probability about whether the decoding of the downlink signal is successful. In this case, the probability may include, but is not limited thereto, a successful downlink signal decoding probability accumulated from an initial access to the preconfigured timing point in Proposition 1, or a successful downlink signal decoding probability during a time period determined based on the preconfigured timing point. In Proposal 1, when information on whether the decoding of the downlink signal has been successful is indicated as a bitmap, the size of the CSI transmitted may increase depending on the N value. Yet, according to Proposition 2, since the information on whether the decoding of the downlink signal has been successful is presented as a probability using bits of a fixed size, it is advantageous in that the CSI can be transmitted more compactly.

Additionally, the above-described CSI may further include information indicating whether a channel is a Line Of Sight (LOS) environment or a Non-LOS (NLOS) environment according to Proposal 4 described later.

Proposal 3

When a base station configures a group-wise CSI report (e.g., RSRP/RSRQ (Reference Signal Received Quality)/ SINR(Signal to Interference and Noise Ratio) report), a representative UE configured/indicated by the base station may report a CSI for a group as a representative.

Figure 13:
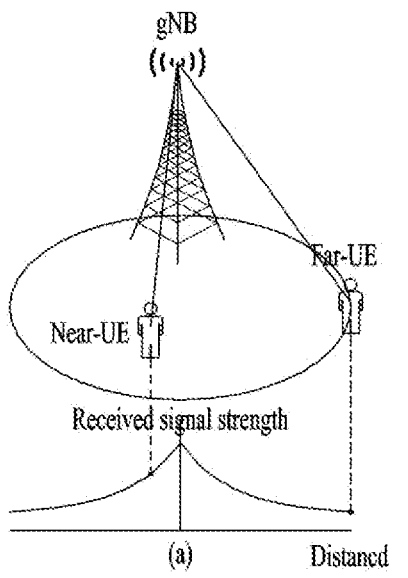
FIG. 13 is a diagram illustrating near-far effects in general NTN and TN.
Figure 13:
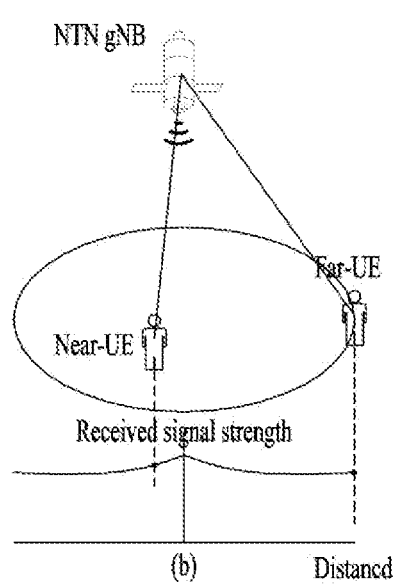

FIG. 13 is a diagram illustrating near-far effects in a general NTN and a TN. In the case of NTN, as shown in FIG. 13, since a distance between a satellite and a ground surface is much farther than a distance between UEs, a near-far effect is not large compared to a general Terrestrial Network (TN). Hence, in the case of RSRP, it may be inefficient in terms of resource operation for the base station to receive CSI reports from all UEs. Accordingly, a group-wise CSI reporting may be considered as Proposal 3, and RSRP/RSRQ/SINR may be considered as an example of a representative CSI in a group-wise CSI reporting. The base station may configure a group and a representative UE for the group-wise CSI reporting. In order for the representative UE to accurately report a CSI, UEs included in the group may forward the results measured by themselves to the representative UE. Since it may be difficult for a general UE to serve as a representative UE, a very small terrestrial base station such as a Very Small Aperture Terminal (VSAT) may serve as a representative UE or, if deployed, an Integrated Access and Backhaul (IAB) node may serve as a representative UE to report a CSI to the base station. For example, an IAB-Distributed Unit (IAB-DU) may collect CSIs from neighboring UEs using a TN, perform filtering such as average operation on the collected CSIs, and report it to the base station. How average operation/filtering is applied may be configured/indicated by the base station (or a Central Unit (CU), and a subject that reports a CSI may include an IAB-DU or an IAB-Mobile Termination (IAB-MT), which uses F1 Application Protocol (F1-AP).

Hereinafter, an example of an operation between a base station and a UE in NTN according to the above-described proposal 3 will be described. For convenience of description, it is assumed that UE 1 of two UEs is a representative UE. Yet, the above-described proposal is applicable to a situation in which two or more UEs operate, and another UE may be set as a representative UE.

The base station may transmit configuration information to UE 1/UE2. In this case, the configuration information may include at least one of CSI reporting configuration information, CSI resource configuration information, and configuration information (e.g., group information, representative UE information) for group-wise CSI reporting. The configuration information may be transmitted through higher layer signaling (e.g., RRC/MAC-CE), but is not limited thereto.

In addition, the base station may transmit control information to the UE 1/UE2. In this case, the control information may be DCI and may include information for triggering a CSI reporting. When a group-wise CSI reporting is configured, the control information may be transmitted only to the representative UE according to an embodiment.

The base station may transmit a CSI-related RS (e.g., CSI-RS) to the UE 1/UE2, and the UE 1/UE 2 may measure a CSI (e.g., RSRP/RSRQ/SINR/CQI, etc.) based on the received CSI-related RS. More specifically, the UE 1/UE 2 may measure a channel state based on the received CSI-related RS, and obtain a CSI (e.g., RSRP/RSRQ/SINR/CQI, etc.) by measuring the channel state. For example, the UE 2 may transmit a CSI measurement result to the representative UE (e.g., UE1). For example, the representative UE may calculate a group-wise CSI (e.g., the average value of the measured values of the respective UEs) based on its own measurement result and a measurement result of the UE 2, and transmit the calculated group-wise CSI to the base station.

As described above, the representative UE may be a VSAT/very-small terrestrial base station/IAB-DU/IAB-MT, but is not limited thereto. In addition, the base station may be a satellite/aerial vehicle, and the aerial vehicle may be Unmanned Aircraft Systems (UAS) including a Tethered UAS (TUA), Lighter Than Air (LTA) UAS, and a Heavier Than Air (HTA) UAS.

Proposal 4

From a long-term perspective, in an environment where LOS is ensured, a UE may sufficiently predict RSRP, etc. based on satellite's orbit information. Yet, as described above, since NLOS according to surrounding geographic/terrain features has considerable performance degradation, the UE may report to a base station whether a corresponding channel is LOS or NLOS. For example, whether the channel is LOS or NLOS may be represented by 1-bit information and may be reported as a CSI. In this case, whether the channel is LOS or NLOS may mean whether LOS is secured in the channel or LOS is not secured (NLOS) in the channel. Whether the channel is LOS or NLOS may be added to an existing CSI and reported. In addition, according to an embodiment, the UE may report whether the channel is LOS or NLOS through a CSI, together with decoding information according to Proposal 1 described above.

By extending Proposition 4 to apply, it is possible to consider that the UE reports a CSI (e.g., RSRP) and/or a CSI gap between LOS and NLOS (e.g., (average) RSRP gap in LOS and NLOS) in long term, and also reports whether the channel is LOS or NLOS in short term. In addition, when circular polarization is available to the UE, information on which polarization was used for reception (e.g., Right-Handed Circular Polarization/Left-Handed Circular Polarization (RHCP/LHCP) may also be reported.

The UE may distinguish whether a corresponding channel/signal is LOS or NLOS based on various implementation methods/metrics. For example, if the sum of the energy of the strongest path/cluster minus or divided by the sum of the energy of the remaining paths/clusters is above a specific threshold, the UE may determine the corresponding channel/signal as LOS. Alternatively, when a measured delay spread of the path clusters is less than or equal to the specific threshold, the UE may determine the corresponding channel/signal as LOS. Alternatively, if a difference between a measured RSRP value and a specific reference RSRP value (assuming LOS) is less than or equal to the specific threshold, the UE may determine the corresponding channel/signal as LOS. In this case, the above-described thresholds may be the values indicated by the base station or the values previously agreed between the base station and the UE.

Figure 14:
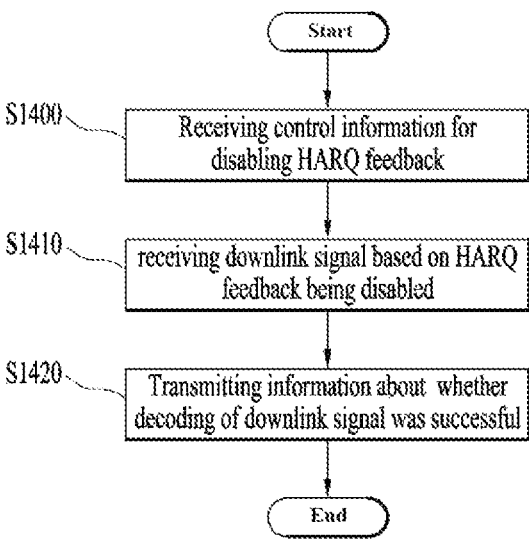
FIG. 14 is a flowchart illustrating operations of a UE according to proposed embodiments.

FIG. 14 is a flowchart illustrating an operation of a UE according to a proposed embodiment.

A UE according to one embodiment may receive control information for disabling (or deactivating) HARQ feedback from a base station (S1400). In NTN, HARQ feedback may be disabled in consideration of RTT (or RTD) relatively, and the UE may receive control information for disabling HARQ feedback from the base station.

The HARQ feedback may be disabled based on the received control information, and the UE may receive a downlink signal based on the HARQ feedback disabled (S1410). For example, the downlink signal may include a PDCCH and/or a PDSCH (scheduled by the PDCCH). When the HARQ feedback is disabled, the UE does not perform HARQ feedback on the received downlink signal. If the UE does not perform HARQ feedback, it may be difficult for the base station to know whether the UE has properly received/decoded the downlink signal, and it may be difficult to appropriately configure parameters such as MCS. Accordingly, the UE may transmit information on whether decoding of the received downlink signal is successful to the base station as a CSI. Specifically, the UE may transmit information on whether decoding of the downlink signal is successful to the base station as a CSI based on a preconfigured timing point (S1420). The information on whether decoding has been successful may correspond to the decoding information of Proposal 1 described above. The preconfigured timing point may be a value configured by the base station or a value agreed in advance between the base station and the UE, and may be configured through higher layer signaling, but is not limited thereto. For example, the preconfigured timing point may include a timing point prior to M time units (M is a natural number) from a reporting timing point of a CSI, a CSI reporting triggered timing point, or a timing point of receiving control information (e.g., DCI) for triggering the CSI reporting, but is not limited thereto. In this case, the M value may be determined based on a timing offset value configured for NTN. In NTN, in order to compensate for the long RTD of NTN, a timing offset value Koffset may be configured during a signal transmission/reception process, and the UE may transmit a UL signal at a timing point that reflects the timing offset value Koffset. Accordingly, the above-described M value may also be determined based on the Koffset value, and for example, the M value may be determined as a function of the Koffset value.

According to one embodiment, the UE may transmit information on whether decoding of a downlink signal has been successful during the latest N time units from a preconfigured timing point as a CSI to the base station, and the N may be a natural number of 1 or more. In this case, the time unit may refer to a slot, a sub-slot, or a symbol unit, and the symbol may refer to an OFDM symbol, but is not limited thereto. The information on the success or failure of the decoding may explicitly indicate the success/failure of the decoding, or may implicitly indicate the accumulated information on the success/failure of the decoding.

Specifically, the information on the success/failure of the decoding may be expressed as bitmap information, and each bit of the bitmap information may indicate whether the decoding of the downlink signal is successful in each of the N time units. For example, if N is set to 100, the UE may use 100 bits to represent the information about the success/failure in decoding of the downlink signal during the latest 100 time units from a preconfigured timing point, and each bit may indicate the success/failure in decoding of the downlink signal in each time unit. For example, a bit value of 0 indicates a decoding failure, and a bit value of 1 indicates a decoding success, but the mapping relationship between the bit value and the decoding success/failure may vary depending on an embodiment. Alternatively, according to an embodiment, the UE may use 2 bits to indicate the success/failure in decoding the downlink signal in each time unit. For example, using 2 bits, the UE may indicate both the success/failure in decoding PDSCH received in each time unit and the success/failure in decoding PDCCH that schedules the PDSCH. For example, a 2-bit value of '00' may mean a PDCCH decoding success and a PDSCH decoding success of PDSCH, a 2-bit value of '01' may mean a PDCCH decoding success and a PDSCH decoding failure, a 2-bit value of '10' may mean a PDCCH decoding failure (or PDCCH not detected), and a 2-bit value of '11' may mean 'reserved', by which the present example is non-limited.

As described above, information on whether decoding is successful may be implicitly indicated, and for example, a success/failure of decoding may be indicated with probability. When information on whether decoding is successful is indicated as a bitmap, the size of the bitmap transmitted to the base station may increase as the N value increases. Accordingly, the UE may display information on whether decoding is successful by using bits of a fixed size for a compact CSI reporting. In this case, the information on the success/failure of decoding may mean, for example, a successful decoding probability accumulated from an e initial access to a preconfigured timing point or a successful decoding probability in a specific time period configured by the base station, but is not limited thereto. In this case, the specific time period configured t by the base station may mean a period configured to calculate a success probability of decoding. For example, the specific time period may be set as a time period before X time units from the preconfigured timing point, but is not limited thereto.

According to one embodiment, the UE may transmit not only information on whether decoding is successful but also information on whether a channel is LOS or NLOS to the base station as a CSI. In this case, the information on whether the channel is LOS or NLOS may mean information on whether the LOS is secured in a channel on which the UE and the base station communicate with each other. When the LOS is not secured (NLOS), since performance degradation is large, the UE needs to report whether the LOS is secured in the channel to the base station. For example, the UE may indicate whether the LOS is secured in the channel using 1 bit, and may transmit the 1 bit to the base station as a CSI.

According to the proposed embodiment, even if HARQ feedback is deactivated (or disabled) in NTN, link reliability may be improved by transmitting information on success/failure in decoding a downlink signal to the base station.

Figure 15:
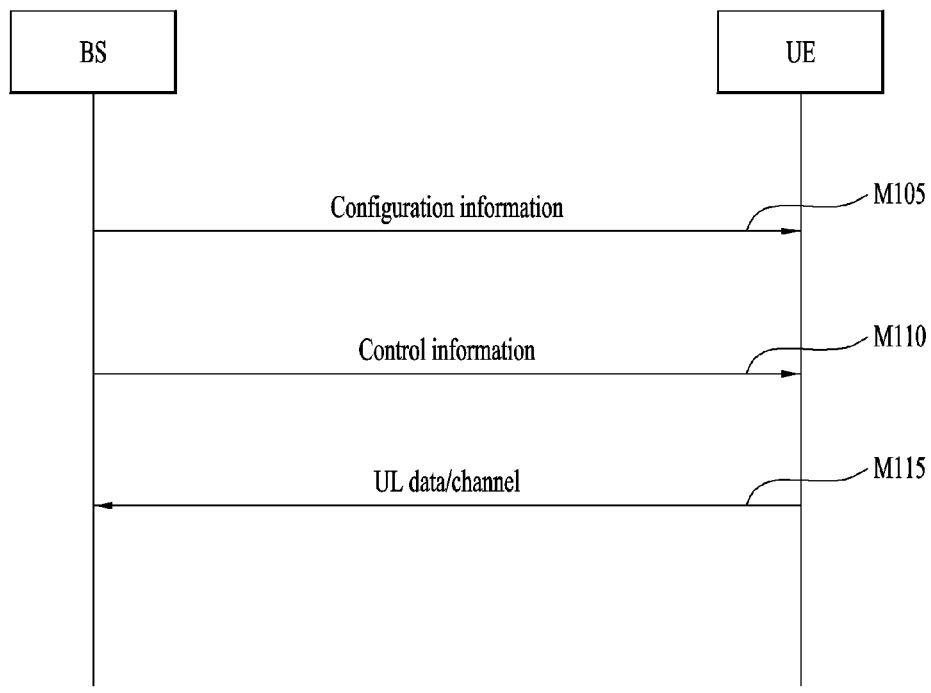
FIG. 15 is a flowchart illustrating operations of transmitting and receiving a UL signal between a BS and a UE according to proposed embodiments.
Figure 16:
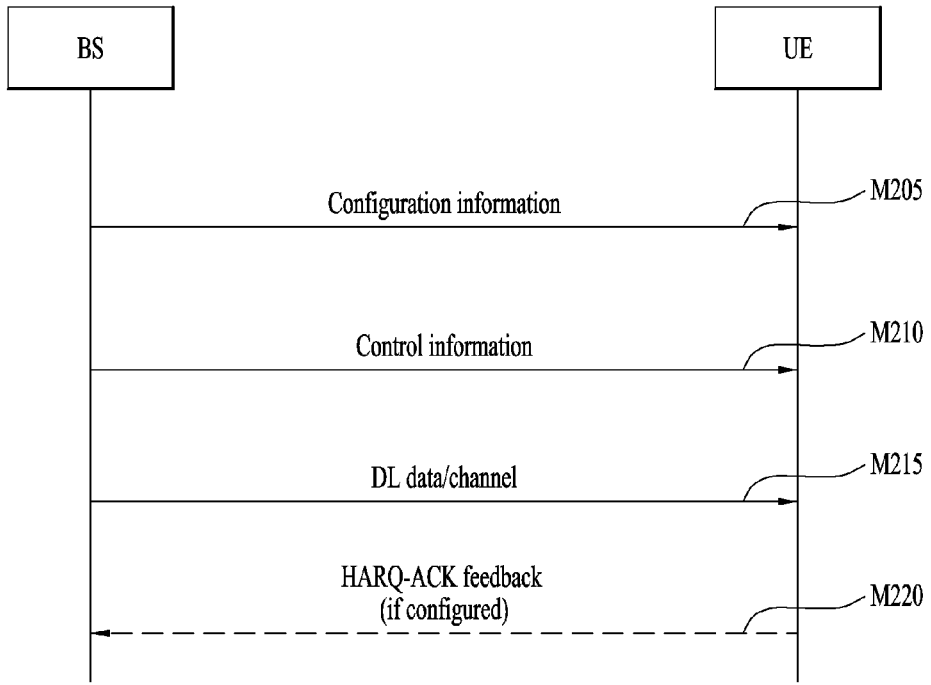
FIG. 16 is a flowchart illustrating operations of transmitting and receiving a DL signal between a BS and a UE according to proposed embodiments.

FIG. 15 is a flowchart illustrating operations of transmitting and receiving a UL signal between a BS and a UE according to the proposed embodiments, and FIG. 16 is a flowchart illustrating operations of transmitting and receiving a DL signal between a BS and a UE according to the proposed embodiments.

Here, the UE and BS are merely examples, and the UE and BS may be replaced with various devices. In addition, FIGS. 15 and 16 are only for convenience of description, and the scope of the present disclosure is not limited to FIGS. 15 and 16. Some of the steps shown in FIGS. 15 and 16 may be omitted/merged depending on situations and/or configurations. When the operations illustrated in FIGS. 15 and 16 are performed, the CSI-related operations described above and the like may be referred to/used.

In this document, the BS may refer to an object that performs data transmission/reception with the UE. For example, the BS may conceptually include one or more transmission points (TPs), one or more transmission and reception points (TRPs), and the like. The TP and/or TRP may include a panel or a transmission and reception unit of the BS. In addition, the term "TRP" may be replaced with the following terms: panel, antenna array, cell (e.g., macro cell, small cell, pico cell, etc.), TP, and BS (gNB, etc.). As described above, the TRP may be identified based on information (e.g., index or ID) on a CORESET group (or CORESET pool). For example, when one UE is configured to perform transmission and reception with a plurality of TRPs (or cells), it may mean that a plurality of CORESET groups (or CORESET pools) are configured for the UE. The configuration of the CORESET group (or CORESET pool) may be performed through higher layer signaling (e.g., RRC signaling, etc.).

Hereinafter, a UL signal transmission/reception operation between the UE and BS will be described in detail with reference to FIG. 15.

Although not shown in FIG. 15, a default HARQ operation mode of the UE may be configured in a step before the RRC connection/configuration as described in the proposed methods (e.g., Proposal 1, Proposal 2, Proposal 3, and Proposal 4). For example, if the cell accessed by the UE is indicated as an NTN cell over a PBCH (MIB) or an SIB, the UE may recognize that the default mode is set to a HARQ-disabled mode. For example, one of a HARQ-disabled configuration and HARQ-enabled configuration(s) may be indicated as the default operation mode over the PBCH (MIB) or SIB (for example, when the cell is indicated as the NTN cell).

The BS may transmit configuration information to the UE (M105). That is, the UE may receive the configuration information from the BS. For example, the configuration information may include: NTN related configuration information described in the proposed methods (e.g., Proposal 1, Proposal 2, Proposal 3, and Proposal 4); configuration information for UL transmission and reception (e.g., PUCCH-config, PUSCH-config, etc.); HARQ process related configurations (e.g., enabling/disabling of HARQ feedback, the number of HARQ processes, etc.); and/or CSI report related configurations (e.g., CSI report config, CSI report quantity, CSI-RS resource config, etc.). For example, the configuration information may be transmitted through higher layer signaling (RRC or MAC CE). For example, the HARQ feedback enabling/disabling may be configured for each cell group. For example, the HARQ feedback enabling/disabling may be configured by information in the form of a bitmap. For example, the configuration information may include configuration (e.g., time parameters related to decoding information (e.g., N/M, etc.)) related to the decoding information reporting/group-wise CSI reporting related configuration (e.g., representative UE configuration), etc., which are described in the proposed methods described above.

For example, the operation in which the BS (100/200 in FIG. 18) transmits the configuration information to the UE (100/200 in FIG. 18) in step M105 may be performed by the devices of FIGS. 18 to 20 to be described below. For example, referring to FIG. 18, the one or more processors 102 may control the one or more transceivers 106 and/or one or more memories 104 to receive the configuration information, and the one or more transceivers 106 may receive the configuration information from the BS.

For example, the operation in which the UE (100/200 in FIG. 18) receives the configuration information from the BS (100/200 in FIG. 18) in step M105 may be performed by the devices of FIGS. 18 to 20 to be described below. For example, referring to FIG. 18, the one or more processors 102 may control the one or more transceivers 106 and/or one or more memories 104 to receive the configuration information, and the one or more transceivers 106 may receive the configuration information from the BS.

The BS may transmit the configuration information to the UE (M110). That is, the UE may receive the configuration information from the BS. For example, the configuration information may be transmitted/received in DCI. For example, the configuration information may include UL data, control information for channel transmission/reception, scheduling information, resource allocation information, and HARQ feedback related information (e.g., a new data indicator (NDI), a redundancy version (RV), the number of HARQ processes, a downlink assignment index (DAI), a transmit power control (TPC) command for a scheduled PUCCH, a PUCCH resource indicator, a PDSCH-to-HARQ_feedback timing indicator, etc.). For example, the DCI may be one of DCI format 1_0 or DCI format 1_1.

For example, whether the HARQ feedback is enabled or disabled may be configured based on the DCI. For example, the DCI may include information that triggers a CSI reporting. For example, HARQ feedback enable/disable may be configured based on PDSCH-to-HARQ_feedback timing indicator field/PUCCH resource indicator field in DCI. For example, the above-described operation of the above-described step M110 of transmitting the configuration information to the UE (100/200 in FIG. 18) by of the base station (100/200 in FIG. 18) may be implemented by the devices of FIG. 18 to FIG. 20, which will be described below. For example, referring to FIG. 18, one or more processors 102 may control one or more transceivers 106, one or more memories 104 and/or the like to transmit the configuration information, and the one or more transceivers 106 may transmit the configuration information to the UE.

For example, the operation in which the UE (100/200 in FIG. 18) receives the configuration information from the BS (100/200 in FIG. 18) in step M110 may be performed by the devices of FIGS. 18 to 20 to be described below. For example, referring to FIG. 18, the one or more processors 102 may control the one or more transceivers 106 and/or one or more memories 104 to receive the configuration information, and the one or more transceivers 106 may receive the configuration information from the BS.

The BS may receive UL data/channels (e.g., PUCCH/PUSCH) from the UE (M115). That is, the UE may transmit the UL data/channels to the BS. For example, the UL data/channels may be received/transmitted based on the aforementioned configuration information/control information. For example, the UL data/channels may be received/transmitted according to the proposed method (e.g., Proposal 1, Proposal 2, Proposal 3, and Proposal 4). For example, CSI reporting may be performed over the UL data/channels. The CSI reporting may include transmitting information such as RSRP/CQI/SINR/CRI to the BS. For example, the UL data/channels may include a UE request/report related to the HARQ feedback enabling/disabling. For example, as described in the proposed methods, the UE may report/request the HARQ feedback enabling/disabling based on a report on an increase/decrease in the MCS and a report on an increase/decrease in the number of PDSCH repetitions.

For example, as described in the above proposed method (e.g., Proposal 1, Proposal 2, Proposal 3, Proposal 4, etc., decoding-related information (e.g., bitmap information on decoding success/failure)/decoding probability information/group-wise CSI reporting (e.g., RSRP/RSRQ/SINR)/information related to presence or non-presence of LOS/polarization related information and the like may be transmitted to the base station through the UL data/UL channel.

Figure 18:
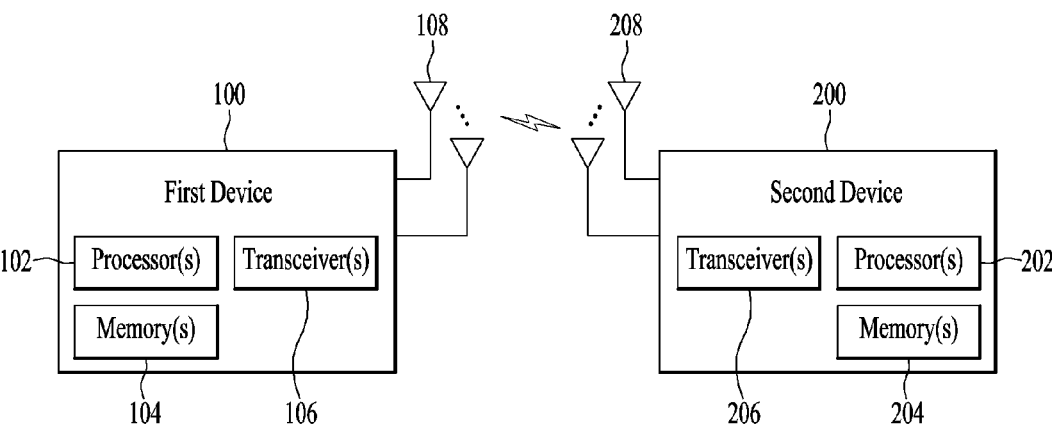
FIG. 18 illustrates wireless devices applicable to the present disclosure.
Figure 19:
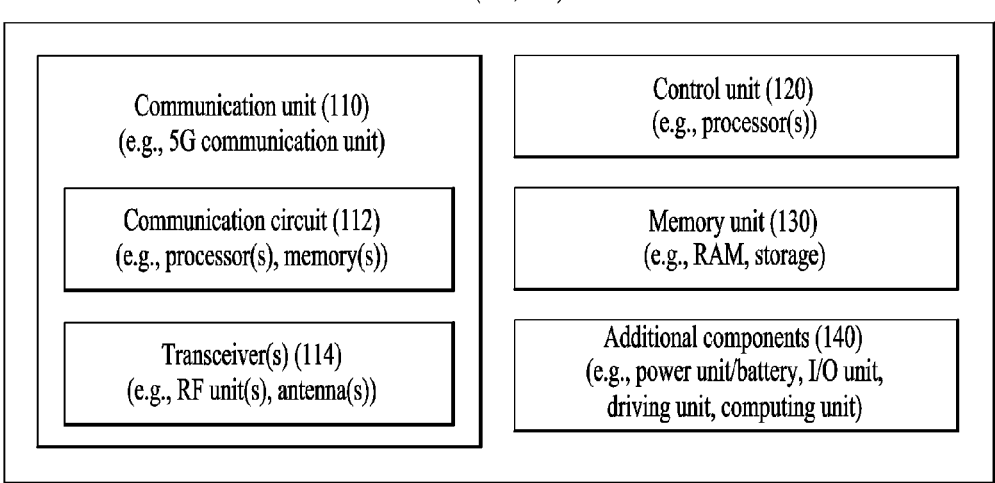
FIG. 19 illustrates another example of a wireless device to which the present disclosure is applied.
Figure 20:
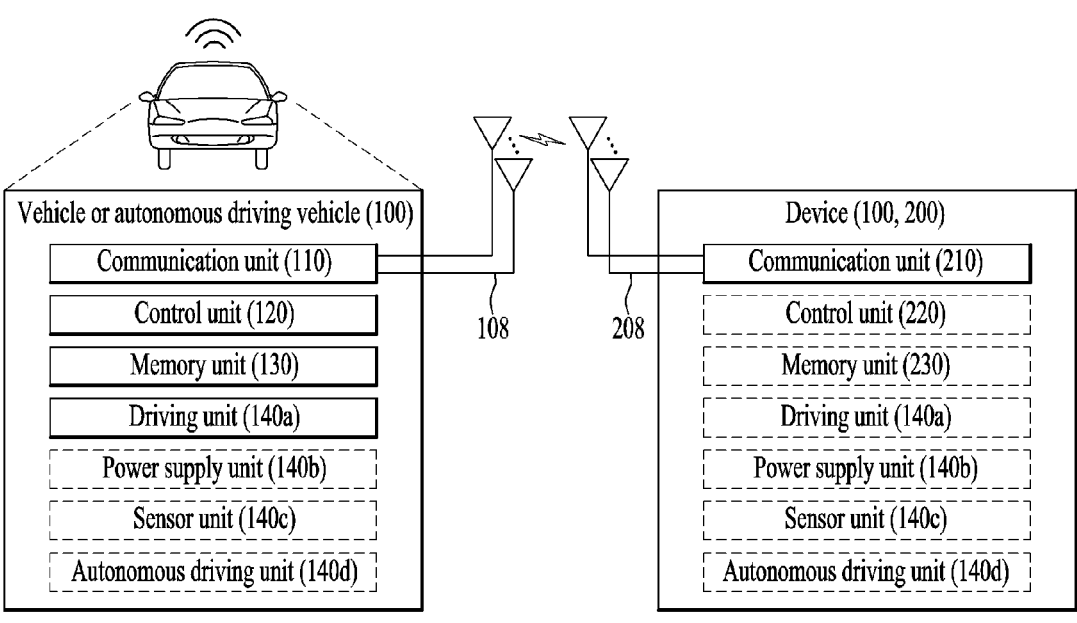
FIG. 20 illustrates a vehicle or an autonomous driving vehicle applied to the present disclosure.

For example, the operation of the step M115 of receiving the UL data/UL channel from the UE (100/200 in FIGS. 18 to 19) by the base station (100/200 in FIG. 18) may be implemented by the devices of FIGS. 18 to 20. For example, referring to FIG. 18, at least one processor 102 may control at least one transceiver 106, at least one memory 104 and/or the like to receive the UL data/UL channel, and the at least one transceiver 106 may receive the UL data/UL channel from the UE.

For example, the operation in which the UE (100/200 in FIG. 18) transmits the UL data/channels to the BS (100/200 in FIGS. 18 to 20) in step M115 may be performed by the devices shown in FIGS. 18 to 20 to be described below. For example, referring to FIG. 18, the one or more processors 102 may control the one or more transceivers 106 and/or one or more memories 104 to transmit the UL data/channels, and the one or more transceivers 106 may transmit the UL data/channels to the BS.

Hereinafter, a DL data/channel transmission/reception operation between the UE and BS according to an embodiment will be described in detail with reference to FIG. 16.

Although not shown in FIG. 16, as described in the above proposed method (e.g., Proposal 1/Proposal 2/Proposal 3/Proposal 4, etc.), a default HARQ operation mode of the UE may be configured in a step prior to RRC connection/setup. For example, if it is indicated that a cell (accessed by the UE) is an NTN cell through the PBCH (MIB) or SIB, the UE may recognize that a default mode is set to HARQ-disabled. For example, the base station may indicate that either the HARQ-disabled setting or the HARQ-enabled setting(s) is a default operation mode through the PBCH (MIB) or the SIB (e.g., indicated as the NTN cell).

The BS may transmit configuration information to the UE (M205). That is, the UE may receive the configuration information from the BS. For example, the configuration information may include: NTN related configuration information described in the proposed methods (e.g., Proposal 1, Proposal 2, Proposal 3, and Proposal 4); configuration information for DL transmission and reception (e.g., PDCCH-config, PDSCH-config, etc.); HARQ process related configurations (e.g., enabling/disabling of HARQ feedback, the number of HARQ processes, etc.); and/or CSI report related configurations (e.g., CSI report config, CSI report quantity, CSI-RS resource config, etc.). For example, the configuration information may be transmitted through higher layer signaling (RRC or MAC CE). For example, the HARQ feedback enabling/disabling may be configured for each cell group. For example, the HARQ feedback enabling/disabling may be configured by information in the form of a bitmap. For example, the configuration information may include configuration (e.g., time parameters related to decoding information (e.g., N/M, etc.)) related to the decoding information reporting/group-wise CSI reporting related configuration (e.g., representative UE configuration), etc., which are described in the proposed method (e.g., Proposal 1/Proposal 2/Proposal 3/Proposal 4, etc.) described above.

For example, the operation in which the BS (100/200 in FIG. 18) transmits the configuration information to the UE (100/200 in FIGS. 18 to 20) in step M205 may be performed by the devices of FIGS. 18 to 20, which will be described later. For example, referring to FIG. 18, the one or more processors 102 may control the one or more transceivers 106 and/or one or more memories 104 to transmit the configuration information, and the one or more transceivers 106 may transmit the configuration information to the UE.

For example, the operation in which the UE (100/200 in FIG. 18) receives the configuration information from the BS (100/200 in FIGS. 18 to 20) in step M205 may be performed by the devices of FIGS. 18 to 20 to be described below. For example, referring to FIG. 18, the one or more processors 102 may control the one or more transceivers 106 and/or one or more memories 104 to receive the configuration information, and the one or more transceivers 106 may receive the configuration information from the BS.

The BS may transmit control information to the UE (M210). That is, the UE may receive the control information from the BS. For example, the control information may be transmitted/received in DCI. For example, the control information may include control information for transmission and reception of DL data/channels, scheduling information, resource allocation information, HARQ feedback related information (e.g., an NDI, an RV, the number of HARQ processes, a DAI, a TPC command for a scheduled PUCCH, a PUCCH resource indicator, a PDSCH-to-HARQ_feedback timing indicator, etc.). For example, the DCI may be one of DCI format 1_0 or DCI format 1_1.

For example, whether HARQ feedback is enabled or disabled may be configured based on the DCI. For example, the DCI may include information that triggers a CSI reporting. For example, HARQ feedback enable/disable may be configured based on the PDSCH-to-HARQ_feedback timing indicator field/PUCCH resource indicator field in DCI.

For example, the operation in which the BS (100/200 in FIG. 18) transmits the control information to the UE (100/200 in FIGS. 18 to 20) in step M210 may be performed by the devices of FIGS. 18 to 20 to be described below. For example, referring to FIG. 18, the one or more processors 102 may control the one or more transceivers 106 and/or one or more memories 104 to transmit the control information, and the one or more transceivers 106 may transmit the control information to the UE.

For example, the operation in which the UE (100/200 in FIG. 18) receives the control information from the BS (100/200 in FIGS. 18 to 20) in step M210 may be performed by the devices of FIGS. 18 to 20 to be described below. For example, referring to FIG. 18, the one or more processors 102 may control the one or more transceivers 106 and/or one or more memories 104 to receive the control information, and the one or more transceivers 106 may receive the control information from the BS.

The BS may transmit DL data/channels (e.g., PDSCH) to the UE (M215). That is, the UE may receive the DL data/channels from the BS. For example, the DL data/channels may be transmitted/received based on the aforementioned configuration information/control information. For example, based on the above-described proposed method, DL data/DL channel may be transmitted/received. For example, the DL data/DL channel may include an RS (e.g., CSI-RS) related to a CSI reporting.

For example, the operation in which the BS (100/200 in FIG. 18) transmits the DL data/channels to the UE (100/200 in FIGS. 18 to 20) in step M215 may be performed by the devices shown in FIGS. 18 to 20 to be described below. For example, referring to FIG. 18, the one or more processors 102 may control the one or more transceivers 106 and/or one or more memories 104 to transmit the DL data/channels, and the one or more transceivers 106 may transmit the DL data/channels to the UE.

For example, the operation in which the UE (100/200 in FIG. 18) receives the DL data/channels from the BS (100/200 in FIGS. 18 to 20) in step M115 may be performed by the devices shown in FIGS. 18 to 20 to be described below. For example, referring to FIG. 18, the one or more processors 102 may control the one or more transceivers 106 and/or one or more memories 104 to receive the DL data/channels, and the one or more transceivers 106 may receive the DL data/channels from the BS.

The base station may receive UL data/UL channels (e.g., PUCCH/PUSCH) from the UE (M220). That is, the UE may transmit UL data/UL channel to the base station. For example, the UL data/UL channel may be received/transmitted based on the above-described configuration information/control information and the like. For example, the UL data/UL channel may be received/transmitted based on the above-described proposed method (e.g., Proposal 1/Proposal 2/Proposal 3/Proposal 4, etc.).

For example, a CSI reporting may be performed through the UL data/UL channel. The CSI reporting may include transmitting information such as RSRP/CQI/SINR/CRI and the like to the base station. For example, decoding-related information (e.g., bitmap information on success/failure)/decoding probability information/group-wise CSI reporting (e.g., RSRP/RSRQ/SINR)/information related to presence/non-presence of LOS/polarization related information and the like may be transmitted to the base station via the UL data/UL channel.

For example, the UL data/UL channel may include a request/report of the terminal related to HARQ feedback enable/disable. For example, HARQ feedback enable/disable may be reported/requested based on a report of increase/decrease of MCS/report of increase/decrease in repeated transmissions of PDSCH, as described in the proposed method described above. When HARQ feedback is enabled, the UL data/UL channel may include HARQ-ACK feedback. For example, the HARQ-ACK feedback may include ACK/NACK information on DL data/DL channel transmitted from the base station. For example, when HARQ-ACK feedback is enabled, the HARQ-ACK feedback may be transmitted/received based on the above-mentioned proposed method (e.g., Proposal 1/Proposal 2/Proposal 3/Proposal 4, etc.).

For example, in the step M220, the operation of receiving the UL data/UL channel from the UE (100/200 in FIG. 18 and FIG. 19) by the base station (100/200 in FIG. 18) may be implemented by the devices of FIG. 18 and FIG. 19. For example, referring to FIG. 18, one or more processors 102 may control one or more transceivers 106, one or more memories 104 and/or the like to receive the UL data/UL channel, and the one or more transceivers 106 may receive the UL data/UL channel from the UE.

For example, in the step M220, the operation of transmitting the UL data/UL channel to the base station (100/200 in FIGS. 18 to 20) by the UE (100/200 in FIG. 18) may be implemented by the devices of FIGS. 18 to 20 described later. For example, referring to FIG. 18, one or more processors 102 may control one or more transceivers 106, one or more memories 104 and/or the like to transmit the UL data/UL channel to the base station.

The above-described operation and signaling performed by the BS/UE may be performed by the devices of FIGS. 18 and 20, which will be described later. For example, the BS may correspond to a first wireless device, and the UE may correspond to a second radio device. In addition, vice versa may be considered in some cases.

For example, the above-described operation and signaling performed by the BS/UE may be processed by one or more processors 102 and 202 of FIGS. 18 to 20, and the above-described operation and signaling performed by the BS/UE may be stored in a memory (e.g., one or more memories 104 and 204 of FIG. 18) in the form of an instruction/program (e.g., executable code) for driving at least one processor (e.g., processors 102 and 202) of FIGS. 18 to 20.

It is obvious that each of the examples of the proposed methods may also be included as one implementation method, and thus each of the examples may be regarded as a kind of proposed method. Although the proposed methods may be implemented independently, some of the proposed methods may be combined (or merged) for implementation. In addition, it may be regulated that information on whether the proposed methods are applied (or information on rules related to the proposed methods) should be transmitted from the BS to the UE in a predefined signal (e.g., a physical layer signal, a higher layer signal, etc.). Higher layers may include, for example, at least one of the following functional layers: MAC, RLC, PDCP, RRC, and SDAP.

Methods, embodiments, or details for implementing the methods proposed in this specification (e.g., Proposal 1, Proposal 2, Proposal 3, Proposal 4, and Proposal 5) may be applied independently. Alternatively, at least one of the methods (embodiments or details) may be applied in combination.

Hereinafter, a description will be given in more detail with reference to the drawings. In the following drawings/description, the same reference symbols may denote the same or corresponding hardware blocks, software blocks, or functional blocks unless described otherwise.

Figure 17:
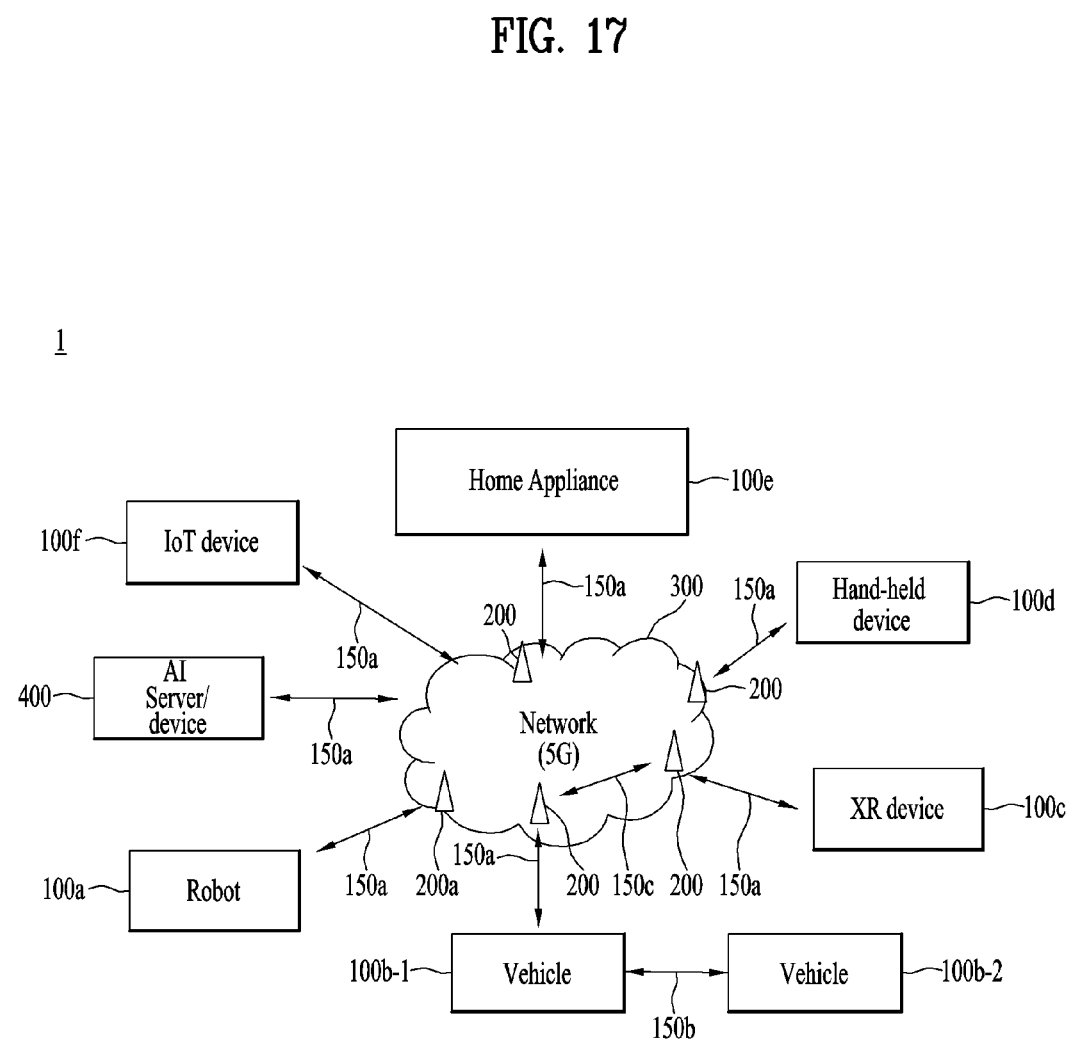

FIG. 17 illustrates a communication system 1 applied to the present disclosure.

Referring to FIG. 17, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (JAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

FIG. 18 illustrates wireless devices applicable to the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

In the present disclosure, at least one memory (e.g., 104 or 204) may store instructions or programs which, when executed, cause at least one processor operably coupled to the at least one memory to perform operations according to some embodiments or implementations of the present disclosure.

In the present disclosure, a computer-readable storage medium may store at least one instruction or computer program which, when executed by at least one processor, causes the at least one processor to perform operations according to some embodiments or implementations of the present disclosure.

In the present disclosure, a processing device or apparatus may include at least one processor and at least one computer memory coupled to the at least one processor. The at least one computer memory may store instructions or programs which, when executed, cause the at least one processor operably coupled to the at least one memory to perform operations according to some embodiments or implementations of the present disclosure.

FIG. 19 illustrates another example of a wireless device applied to the present disclosure. The wireless device may be implemented in various forms according to a use-case/service (refer to FIG. 17).

Referring to FIG. 19, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 17), the vehicles (100*b*-1 and 100*b*-2 of FIG. 17), the XR device (100*c* of FIG. 17), the hand-held device (100*d* of FIG. 17), the home appliance (100*e* of FIG. 17), the IoT device (100*f* of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

The wireless communication technology implemented in the wireless devices 100 and 200 of the present specification may include narrowband Internet of Things (NB-IoT) for low-power communication as well as LTE, NR, and 6G. For example, NB-IoT technology may be an example of low power wide area network (LPWAN) and implemented by standards such as LTE Cat NB1 and/or LTE Cat NB2, not limited to the above-mentioned names. Additionally or alternatively, the wireless communication technology implemented in the wireless devices 100 and 200 of the present disclosure may perform communication based on LTE-M. For example, LTE-M may be an example of LPWAN and called by various names such as enhanced machine type communication (eMTC). For example, LTE-M may be implemented by at least one of various standards such as 1) LTE CAT 0, 2) LTE Cat M1, 3) LTE Cat M2, 4) LTE non-bandwidth limited (non-BL), 5) LTE-MTC, 6) LTE machine type communication, and/or 7) LTE M, not limited to these names. Additionally or alternatively, the wireless communication technology implemented in the wireless devices 100 and 200 of the present disclosure may include at least one of ZigBee, Bluetooth, and low power wide area network (LPWAN) in consideration of low power communication, not limited to these names. For example, ZigBee may create a personal area network (PAN) related to small/ low-power digital communication based on various standards such as IEEE 802.15.4, and may be called by various names.

FIG. 20 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 20, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The above-described embodiments are combinations of elements and features of the present disclosure in specific forms. The elements or features may be considered selective unless mentioned otherwise. Each element or feature may be implemented without being combined with other elements or features. Further, the embodiments of the present disclosure may be configured by combining some of the elements and/or features. The order of operations described in the embodiments of the present disclosure may be rearranged. Several configurations or features of any one embodiment may be included in another embodiment or may be replaced with related configurations or features of another embodiment. It is obvious that claims that are not explicitly cited in the appended claims may be combined to form an embodiment or included as a new claim by amendment after filing.

Various embodiments of the present disclosure may be carried out in other specific ways than those set forth herein without departing from the essential characteristics of the present disclosure. The above implementations are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure may be used for a user equipment (UE), a base station (BS), or other devices in wireless mobile communication systems.

What is claimed is:

1. A method by a user equipment (UE) comprising:
receiving channel state information (CSI) report configuration information;
receiving configuration information including bit information for identifying whether a hybrid automatic repeat and request (HARQ) feedback is enabled or disabled;
receiving a downlink control channel including downlink control information,
wherein the downlink control information includes resource assignment information for a downlink data channel; and
receiving the downlink data channel based on the resource assignment information,
wherein the HARQ feedback related to the downlink data channel is disabled based on the configuration information, and
wherein, based on the downlink data channel being received within the latest N time units from a preconfigured time point, HARQ acknowledgement (ACK) information for the downlink data channel is transmitted as CSI based on the CSI report configuration information.

2. The method of claim 1, wherein the HARQ ACK information is transmitted through bitmap information, and wherein the HARQ ACK information is represented by at least one bit included in the bitmap information.

3. The method of claim 2, wherein each bit of the bitmap information indicates whether decoding of each of downlink signals received in the N time units is successful.

4. The method of claim 1, wherein the HARQ ACK information is represented by 2 bits included in bitmap information and wherein the 2 bits indicate whether decoding of the downlink data channel received in the N time units and the downlink control channel is successful.

5. The method of claim 1, wherein the preconfigured timing point includes a timing point before M time units from a reporting timing point of the CSI, a timing point of triggering the reporting of the CSI, or a timing point of receiving control information for triggering the reporting of the CSI and wherein the Mis a natural number equal to or greater than 1.

6. The method of claim 5, wherein a value of the M is determined based on a timing offset value configured for a non-terrestrial network (NTN).

7. The method of claim 1, wherein the time unit includes a slot, a sub-slot, or a symbol.

8. The method of claim 1, wherein the CSI further includes information indicating whether a channel is a Line Of Sight (LOS) environment or a Non-LOS (NLOS) environment.

9. A user equipment comprising:
at least one Radio Frequency (RF) unit;
at least one processor; and
at least one computer memory operably connected to the at least one processor and enabling the at least one processor to perform an operation when executed, the operation comprising:
receiving channel state information (CSI) report configuration information;
receiving configuration information including bit information for identifying whether a hybrid automatic repeat and request (HARQ) feedback is enabled or disabled;
receiving a downlink control channel including downlink control information,
wherein the downlink control information includes resource assignment information for a downlink data channel; and receiving a downlink data channel based on the resource assignment information; and
wherein the HARQ feedback related to the downlink data channel is disabled based on the configuration information, and
wherein, based on the downlink data channel being received within the latest N time units from a preconfigured time point, HARQ acknowledgement (ACK) information for the downlink data channel is transmitted as CSI based on the CSI report configuration information.

10. A method by a base station comprising:
transmitting channel state information (CSI) report configuration information;
transmitting configuration information including bit information for identifying whether a hybrid automatic repeat and request (HARQ) feedback is enabled or disabled to a user equipment;
transmitting a downlink control channel including downlink control information,
wherein the downlink control information includes resource assignment information for a downlink data channel; and
transmitting the downlink data channel to the user equipment based on the resource assignment information,
wherein the HARQ feedback related to the downlink data channel is disabled based on the configuration information, and
wherein, based on the downlink data channel being received within the latest N time units from a preconfigured time point, HARQ acknowledgement (ACK) information for the downlink data channel is received as CSI based on the CSI report configuration information.

* * * * *